(12) United States Patent
Lagos et al.

(10) Patent No.: US 10,762,062 B2
(45) Date of Patent: Sep. 1, 2020

(54) DATA GOVERNANCE: CHANGE MANAGEMENT BASED ON CONTEXTUALIZED DEPENDENCIES

(71) Applicant: Xerox Corporation, Norwalk, CT (US)

(72) Inventors: Nikolaos Lagos, Grenoble (FR); Jean-Yves Vion-Dury, Biviers (FR)

(73) Assignee: XEROX CORPORATION, Norwalk, CT (US)

( * ) Notice: Subject to any disclaimer, the term of this patent is extended or adjusted under 35 U.S.C. 154(b) by 689 days.

(21) Appl. No.: 15/089,858

(22) Filed: Apr. 4, 2016

(65) Prior Publication Data

US 2017/0288940 A1 Oct. 5, 2017

(51) Int. Cl.
*G06F 16/21* (2019.01)

(52) U.S. Cl.
CPC .................... *G06F 16/21* (2019.01)

(58) Field of Classification Search
CPC ........................................... G06F 16/21
See application file for complete search history.

(56) References Cited

U.S. PATENT DOCUMENTS

| | | | |
|---|---|---|---|
| 5,634,056 A | 5/1997 | Casotto | |
| 6,567,814 B1 * | 5/2003 | Bankier | ............ G06F 17/30539 |
| 6,571,375 B1 | 5/2003 | Narain et al. | |
| 7,408,560 B2 | 8/2008 | Staples et al. | |
| 9,557,879 B1 * | 1/2017 | Wang | ................... G06F 3/0481 |
| 2008/0147704 A1 | 6/2008 | Godwin et al. | |
| 2010/0017702 A1 | 1/2010 | Carroll | |
| 2015/0356073 A1 | 12/2015 | Vion-Drury et al. | |

FOREIGN PATENT DOCUMENTS

SU            1119024 A1 * 10/1984

OTHER PUBLICATIONS

Signified et. al., forward vs backward chaining Feb. 22, 2011 [captured on Sep. 7, 2013 on archive.org], semanticweb.com, https://web.archive.org/web/20130907161909/http://answers.semanticweb.com/questions/3304/forward-vs-backward-chaining.*
Rowe, Artificial Intelligence through Prolog 1988, Prentice-Hall, https://faculty.nps.edu/ncrowe/book/book.html, /tableconts.html, /chap7.html.*
Sktrdie et al., why isn't RDF more popular on HN? Mar. 29, 2014, ycombinator.com, https://news.ycombinator.com/item?id=7491925.*

(Continued)

*Primary Examiner* — Jason G Liao
(74) *Attorney, Agent, or Firm* — Fay Sharpe LLP

(57) ABSTRACT

A method for change management includes providing a dependency graph as an instantiation of a linked resource model in which a plurality of resources are linked by at least one dependency. The resources include at least one source resource and at least one target resource, each of the at least one dependency specifying preconditions on at least one of the at least one source resources for the dependency to be activated and an impact on at least one of the at least one target resources when the dependency is activated. A change to one of the plurality of resources is propagated to at least one other of the plurality of resources in the graph and information based on the propagation is output.

16 Claims, 17 Drawing Sheets

(56) References Cited

OTHER PUBLICATIONS

Lepasquale et al., Prints a minimal set of packages required to install the package May 27, 2015 [screen capture on Apr. 1, 2019], stackexchange.com, https://stackoverflow.com/questions/30472382/prints-a-minimal-set-of-packages-required-to-install-the-package.*

Polsky, Baking it in: Changement management as a part of data governance Nov. 28, 2012, https://blogs.sas.com/content/datamanagement/2012/11/28/baking-it-in-change-management-as-part-of-data-governance/.*

Google Search: change management [captured Jul. 30, 2012], Google, https://www.google.com/search?source=hp&ei=VpIAXZb3Ouzx5gLYkp8w&q=change+management&oq=change+management&gs_l=psy-ab.3..0I2j0i13 1I4j0I4.1588.3302..3471...0.0..0.65.729.17......0....1..gws-wiz.....0.ThHgw4f3iic&ved=0ahUKEwiW-pyer93jAhXsuFkKHVjJ.*

Google Search: digital change management [captured Jul. 30, 2012], Google, https://www.google.com/search?ei=b5IAXZOjGuaW_Qako59A&q=digital+change+management&oq=digital+change+management&gs_l=psy-ab.3. .0i7i30j0j0i7i30j0j0i7i30I6.93455.95502..96491...0.0..0.96.523.8......0.... 1..gws-wiz.......0i71j0i13.aoGjNDT5.*

Google Search: data change management [captured Jul. 30, 2012], Google, https://www.google.com/search?ei=eJ9AXbeTN4OA5wKNq5vQDQ&q=data+change+management&oq=data+change+management&gs_l=psy-ab.3. .0j0i7i30I9.1564783.1565446..1565882...0.0..0.75.339.5......0.... 1..gws-wiz.......0i71j0i13.vDB0EpCjZ5A&ved=0ahUKEwi3.*

Concrete | Definition of Concrete at dictionary.com [captured on Jul. 30, 2019], dictionary.com, https://www.dictionary.com/browse/concrete#.*

Feray, Weighted dependency graphs May 12, 2016, arXiv.org, abstract.*

Without Seeing Your Application's Dependency Graph, You're Flying Blind date unknown, ndepend.com, https://blog.ndepend.com/without-dependency-graph-flying-blind/.*

"What is big data management?"—Definition from WhatIs.com, pp. 1-4, downloaded at http://searchdatamanagement.techtarget.com/definition/big-data-management on Nov. 23, 2015.

Australian Government Recordkeeping Metadata Standard Version 2.0 Implementation Guidelines, pp. 1-114 (2011), Available at: www.naa.gov.au/records-management/publications/agrk-metadata-standard.aspx.

OWL 2 Web Ontology Language. Structural Specification and Functional-Style Syntax (Second Edition) W3C Recommendation, pp. 1-63 (Dec. 11, 2012).

RDF 1.1 Concepts and Abstract Syntax, W3C Recommendation, pp. 1-22 (Feb. 25, 2014), downloaded at http://www.w3.org/TR/rdf11-concepts/#section-rdf-graph.

Premis Data Dictionary for Preservation Metadata (Official Web Site), The Library of congress USA, pp. 1-2 (2015), downloaded at www.loc.gov/standards/premis/ on Nov. 24, 2015.

Beaudoin, J. E., "Context and Its Role in the Digital Preservation of Cultural Objects," D-LIB Magazine, vol. 18, No. 11/12, pp. 1-15 (Nov. 2012).

Conway, P., "Preservation in the Digital World," Council on Library and Information Resources, Washington, DC., pp. 1-19 (Mar. 1996) Available at http://www.clir.org/pubs/reports/reports/conway2/index.html.

Beckett, D., et al., "RDF 1.1 Turtle—Terse RDF Triple Language Turtle," World Wide Web Consortium (W3C), pp. 1-17 (Feb. 25, 2014), Retrieved Dec. 16, 2015.

Cuoq, P. When in doubt, express intent, and leave the rest to the compiler, Trust-in-Soft, pp. 1-8 (Mar. 15, 2015), available at http://trust-in-soft.com/when-in-doubt-express-intent-and-leave-the-rest-to-the-compiler/.

Dam, K. et al., An agent-oriented approach to change propagation in software evolution, Australian Software Engineering Conf. (ASWEC 2006), pp. 309-318 (2006).

Grosof, B., et al., "Description Logic Programs: Combining Logic Programs with Description Logic," Proc. WWW2003, pp. 48-57 (May 2003).

Johnson, C., "Forensic Software Engineering and the Need for New Approaches to Accident Investigation," Computer Safety, Reliability and Security, vol. 1943 of Lecture Notes in Computer Science, pp. 420-429 (Jun. 2001).

Lagos, N., et al., "On the Preservation of Evolving Digital Content—The Continuum Approach and Relevant Metadata Models," in Metadata and Semantics Research, vol. 544, E. Garoufallou, R. J. Hartley, and P. Gaitanou, Eds. Cham: Springer International Publishing, pp. 15-26 (2015).

Leveson, N. G. "Intent Specifications: An Approach to Building Human-Centered Specifications," IEEE Trans. Softw. Eng. 26, 1, pp. 15-35 (2000).

Marketakis, Y., et al., "Dependency Management for Digital Preservation Using Semantic Web Technologies," Int. J. Digital Libraries, vol. 10(4), pp. 159-177 (2009).

Moreau, L., et al., The Open Provenance Model Core Specification (v1.1). J. Future Generation Computer Systems, vol. 27(6), pp. 743-756 (Jun. 2011).

Rusher, J., "Triplestore," p. 1, downloaded at http://www.w3.org/2001/sw/Europe/events/20031113-storage/positions/rusher.html) on Feb. 12, 2016.

Tzitzikas, Y., "Dependency Management for the Preservation of Digital Information," Database and Expert Systems Applications, in Lecture Notes in Computer Science, vol. 4653, pp. 582-592 (2007).

Tzitzikas, Y., et al., "Task-Based Dependency Management for the Preservation of Digital Objects Using Rules," Artificial Intelligence: Theories, Models and Applications, in Lecture Notes in Computer Science, vol. 6040, pp. 265-274 (2010).

Vion-Dury, J.-Y., et al., "Designing for Inconsistency—The Dependency-based PERICLES Approach," Communications in Computer and Information Science, vol. 539, pp. 458-467 (Aug. 2015).

Vion-Dury, J.-Y., et al., "Semantic Version Management based on Formal Certification," Proc. 10th Int'l Conf. on Software Paradigm Trends. (Eds.) Pascal Lorenz and Marten van Sinderen and Jorge Cardoso. pp. 19-30 (Jul. 2015).

Webb, C., et al., "'Oh, you wanted us to preserve that?!' Statements of Preservation Intent for the National Library of Australia's Digital Collections," D-Lib Magazine, vol. 19, No. 1/2, pp. 1-13 (2013).

Wikipedia 'Nested transaction', pp. 1-2, downloaded at https://en.wikipedia.org/wiki/Nested_transaction, on Nov. 23, 2015.

Wikipedia, "Triplestore," pp. 1-3 downloaded at https://en.wikipedia.org/wiki/Triplestore on Feb. 12, 2016.

\* cited by examiner

```
ex:XmlValidationDescription rdf:type owl:Class ;
    rdfs:subClassOf lrm:Description .
ex:XmlValidationPreCondition rdf:type owl:Class ;
    rdfs:subClassOf lrm:Plan .
ex:XmlValidationImpact rdf:type owl:Class ;
    rdfs:subClassOf lrm:Plan .
ex:XmlValidation rdf:type owl:Class ;
  rdfs:subClassOf lrm:ConjunctiveDependency;
  owl:equivalentClass [ rdf:type owl:Class ;
    owl:intersectionOf (
    [
      rdf:type      owl:Restriction ;
      owl:onProperty   lrm:intention ;
      owl:someValuesFrom  ex:XmlValidationDescription
    ] [
      rdf:type      owl:Restriction ;
      owl:onProperty   lrm:precondition ;
      owl:someValuesFrom  ex:XmlValidationPreCondition
    ] [
      rdf:type      owl:Restriction ;
      owl:onProperty   lrm:impact ;
      owl:someValuesFrom  ex:XmlValidationImpact
    ] ] .
```

*FIG. 3*

```
ex:xmlValidationDescription rdf:type owl:NamedIndividual ;
    rdf:type lrmDescription .
ex:xmlValidationPreCondition rdf:type owl:NamedIndividual ;
    rdf:type lrmPlan .
ex:xmlValidationImpact rdf:type owl:NamedIndividual ;
    rdf:type lrmPlan .
ex:XmlValidation rdf:type owl:Class ;
    rdfs:subClassOf lrm:ConjunctiveDependency ;
    owl:intersectionOf (
        [
            rdf:type        owl:Restriction ;
            owl:onProperty  lrm:intention ;
            owl:hasValue    ex:xmlValidationDescription
        ]
        [
            rdf:type        owl:Restriction ;
            owl:onProperty  lrm:precondition ;
            owl:hasValue    ex:xmlValidationPreCondition
        ]
        [
            rdf:type        owl:Restriction ;
            owl:onProperty  lrm:impact ;
            owl:hasValue    ex:xmlValidationImpact
        ]
    ) .
```

FIG. 4

```
#Axiomatization:

Specializing the XMLTransformationDependency class.

ex:XMLTransformationDependency rdf:type owl:Class ;
  rdfs:subClassOf lrm:ConjunctiveDependency;
  owl:equivalentClass [ rdf:type owl:Class ;
    owl:intersectionOf (
    [
      rdf:type        owl:Restriction ;
      owl:onProperty  lrm:intention ;
      owl:someValuesFrom   ex:XmlTransformationIntention
    ] [
      rdf:type        owl:Restriction ;
      owl:onProperty  lrm:precondition ;
      owl:someValuesFrom   ex:XmlTransformationPrecondition
    ] [
      rdf:type        owl:Restriction ;
      owl:onProperty  lrm:impact ;
      owl:someValuesFrom   ex:XmlTransformationImpact
    ])].

Declaration of Intention class as a subclass of the Description class

lrm:Intention rdfs:subClassOf lrm:Description.

Declaration of TransformationIntention class as a subclass of the Intention class

ex:TransformationIntention rdfs:subClassOf lrm:Intention.

ex:XmlTransformationPrecondition rdfs:subClassOf lrm:Plan.
ex:XmlTransformationImpact rdfs:subClassOf lrm:Plan.

#Instances at time t:

Declaration of an instance of the class TransformationIntention that stands for the intention transform (see also Figure 3).

ex:transform rdf:type owl:NamedIndividual ;
     rdf:type ex:TransformationIntention;
     rdfs:comment: "enable transformation of an entity into another entity of the same type".

Declaration of a precondition for the transformation. The corresponding precondition checks whether the XML object to be transformed is of type XML, denoted by !(?x rdf:type ex:XMLObject). The symbol ! denotes that the triple (?x rdf:type ex:XMLObject) can be an inferred one (depending on the infrastructure this could be for example at run-time using backward chaining). The precondition checks also whether the XML object to be transformed is well-formed denoted by the expression well-formed(?x) WHERE (?dep lrm:from ?x). The language for writing pre-conditions
```

FIG. 10

```
can be SPARQL-based SPIN and/or custom ones can be used.

ex:xmlTransPrec rdf:type owl:NamedIndividual ;
    rdf:type ex:XmlTransformationPrecondition;
    rdfs:comment "we need to make sure that the XML object to be transformed is well-formed";
    lrm:code "well-formed(?x) WHERE (?dep lrm:from ?x. (?x rdf:type ex:XMLObject))".

Declaration of the impact for the transformation. The impact is to call service that will generate the resulting XML transformed object. The dependency ID (?dep) denotes that the dependency will be instantiated at the time of the call) and the type of the object to be generated are passed as parameters to the service. The language for writing pre-conditions can be SPARQL-based and/or custom ones can be used.

ex:xmlTransImpact rdf:type owl:NamedIndividual ;
    rdf:type ex:XmlTransformationImpact;
    rdfs:comment "the impact is calling a service that generate the new XML object";
    lrm:code " call (generationService (?dep, rdf:type (ex:XMLObject))".

ex:xmlTransDep rdf:type owl:NamedIndividual ;
    rdf:type ex:XMLTransformationDependency;
    lrm:intention ex:transform;
    lrm:precondition ex:xmlTransPrec;
    lrm:impact ex:xmlTransImpact;
    lrm:from ex:XSLT;
    lrm:from ex:XMLOrig;
    lrm:to ex:XMLTrans
```

FIG. 11

Rendering Dependency (ies):

*#documentation:*

Declaration of the different intentions linked to the rendering related dependencies. The intersection between the Release and Develop classes is the empty set, meaning that no entity can belong to the both classes at the same time.

exc:Release rdfs:subClassOf Irmi:intention;
    owl:disjointWith exc:Develop.
exc:Develop rdfs:subClassOf Irmi:intention.
exc:Render rdfs:subClassOf Irmi:intention.

Specializing the RenderingDependency class.

exc:RenderingDependency rdf:type owl:Class ;
  rdfs:subClassOf Irmi:ConjunctiveDependency ;
  owl:equivalentClass [ rdf:type owl:Class ;
    owl:intersectionOf (
      [
        rdf:type  owl:Restriction ;
        owl:onProperty  Irmi:intention ;
        owl:someValuesFrom  exc:Render
      ]
      [
        rdf:type  owl:Restriction ;
        owl:onProperty  Irmi:precondition ;
        owl:someValuesFrom  exc:RenderPrecondition
      ]

```
] [
    rdf:type        owl:Restriction ;
    owl:onProperty  lrm:Impact ;
    owl:someValuesFrom  ex:RenderImpact
]) ].
```

*Instances at time t:*

```
ex:render rdf:type owl:NamedIndividual ;
    rdf:type ex:Render.

ex:develop rdf:type owl:NamedIndividual ;
    rdf:type ex:Develop.

ex:release rdf:type owl:NamedIndividual ;
    rdf:type ex:Release.

ex:renderPrec rdf:type owl:NamedIndividual ;
    rdf:type ex:RenderPrecondition.

ex:renderImp rdf:type owl:NamedIndividual ;
    rdf:type ex:RenderImpact.
```

*FIG. 12B*

```
ex:rendDevDep rdf:type owl:NamedIndividual ;
    rdf:type ex:RenderingDependency;
    lrm:intention ex:render, ex:develop;
    lrm:precondition ex:renderPrec;
    lrm:impact ex:renderImp;
    lrm:from ex:XMLOrig;
    lrm:from ex:DLL;
    lrm:from ex:D-Connector;
    lrm:to ex:R'.

ex:rendRelDep rdf:type owl:NamedIndividual ;
    rdf:type ex:RenderingDependency;
    lrm:intention ex:render, ex:release;
    lrm:precondition ex:renderPrec;
    lrm:impact ex:renderImp;
    lrm:from ex:XMLTrans;
    lrm:from ex:DLL;
    lrm:from ex:D-Connector;
    lrm:to ex:R.
```

FIG. 13

```
#Change of XMLOrig for developers only (i.e. develop intention).
#Partial snapshot of KB at time t'>t (after the change):
#Reminder Time t:
ex:rendDevDep lrm:from ex:XMLOrig;
    lrm:to ex:R'.

#Time t':
ex:rendDevDep lrm:from ex:XMLOrig;
    lrm:to ex:R'.

The lrm:changeMarker denotes that ex:XMLOrig has changed, so change propagation has to take place. See also Section 3.3.

lrm:changeMarker lrm:subject ex:XMLOrig.

#Partial snapshot of KB at time t''>t' (after change is propagated):
#Time t'':
ex:rendDevDep lrm:from ex:XMLOrig;
    lrm:to ex:R'₁.

DATA GOVERNANCE: CHANGE MANAGEMENT BASED ON CONTEXTUALIZED DEPENDENCIES

BACKGROUND

The exemplary embodiment relates to the field of data governance and finds particular application in connection with a system and method for managing changes in a collection of data objects.

In the field of digital information preservation, careful acquisition, organization, and distribution of resources is desirable to prevent deterioration and renew the usability of selected groups of digital objects. See, Conway, P., "Preservation in the Digital World," Council on Library and Information Resources, Washington, D.C. (March 1996). Corporations, government agencies and other organizations may develop data management strategies to maintain their data, which may be saved in a variety of file formats, in a way that ensures that future changes are correctly implemented. Existing efforts often focus on extending the life of digital materials beyond their period of creation. However, the initial intentions and assumptions made are often not taken into account. This lack of knowledge about the context of data objects limits understanding, use, care, and sustainable governance of them. See, Beaudoin, J. E., "Context and Its Role in the Digital Preservation of Cultural Objects," D-Lib Magazine, Vol. 18, No. 11/12 (November 2012).

As an example, software induced accidents have been attributed, in part, to poor maintenance. See, Chris Johnson, "Forensic Software Engineering and the Need for New Approaches to Accident Investigation," Computer Safety, Reliability and Security, Vol. 1943 of Lecture Notes in Computer Science, pp 420-429 (June 2001), hereinafter, Johnson 2001. Although many industries already have certification procedures for software maintenance, many companies experience great difficulties in maintaining their software safety cases in the face of new requirements or changing environmental circumstances. The preservation of software systems could benefit if specifications supported wider questions about the reasons why certain approaches were adopted. See, Nancy G. Leveson, "Intent Specifications: An Approach to Building Human-Centered Specifications," IEEE Trans. Softw. Eng. 26, 1, pp. 15-35 (2000), hereinafter, Leveson 2000.

One proposal to address this is to generate intent specification documents that record the context of intended use, including the intent or purpose of the software. These could help by explaining the reasons why any changes were made. For example, preservation intent statements, which are records of the preservation intent for specific classes of digital content, and definitions of significant properties of the collections and objects to be preserved, have been developed. See, Webb, C., et al., "'Oh, you wanted us to preserve that?!' Statements of Preservation Intent for the National Library of Australia's Digital Collections," D-Lib Magazine, Vol. 19, No. 1/2, 2013.

Being able to identify how changes can affect the initial context is especially beneficial in digital preservation environments that are subject to continual change. Preservation models that consider both preservation and active life are desirable. To maintain the reusability of complex digital objects and their associated environment, risks that can occur due to changes in the environment should be evaluated, to allow determining and performing appropriate mitigating actions. See, N. Lagos, et al., "On the Preservation of Evolving Digital Content—The Continuum Approach and Relevant Metadata Models," in Metadata and Semantics Research, vol. 544, E. Garoufallou, et al., Eds., pp. 15-26, 2015.

However, existing approaches tend to consider digital objects individually. They do not take into consideration that changes to one digital object may impact other digital objects.

INCORPORATION BY REFERENCE

The following references, the disclosures of which are incorporated herein by reference in their entireties, are mentioned.

U.S. Pat. No. 5,634,056 issued May 27, 1997, entitled RUN TIME DEPENDENCY MANAGEMENT FACILITY FOR CONTROLLING CHANGE PROPAGATION UTILIZING RELATIONSHIP GRAPH, by A. Casotto.

U.S. Pat. No. 6,571,375, published May 27, 2003, entitled DETERMINING DEPENDENCY RELATIONSHIPS AMONG DESIGN VERIFICATION CHECKS, by P. Narain, et al.

U.S. Pub. No. 20040174382, published Sep. 9, 2004, entitled SYSTEM AND METHOD FOR DYNAMIC PROPAGATION AND DISPLAY OF GRAPHICAL EDITS, by D. Staples, et al.

U.S. Pub. No. 20080147704, published Jun. 19, 2008, entitled SYSTEMS AND METHODS FOR PROPAGATION OF DATABASE SCHEMA CHANGES, by D. A. Godwin, et al.

U.S. Pub. No. 20100017702, published Jan. 21, 2010, entitled ASYNCHRONOUS PARTIAL PAGE UPDATES BASED ON DYNAMIC DEPENDENCY CALCULATION, by P. L. H. Carroll, et al.

BRIEF DESCRIPTION

In accordance with one aspect of the exemplary embodiment, a method for change management includes providing a dependency graph as an instantiation of a linked resource model in which a plurality of resources are linked by at least one dependency. The resources include at least one source resource and at least one target resource, each of the at least one dependency specifying preconditions on at least one of the at least one source resource for the dependency to be activated and an impact on at least one of the at least one target resources when the dependency is activated. A change to one of the plurality of resources is propagated to at least one other of the plurality of resources in the graph and information based on the propagation is output.

One or more of the steps of the method can be performed with a processor.

In accordance with another aspect of the exemplary embodiment, a system for change management includes memory which stores a dependency graph as an instantiation of a linked resource model in which a plurality of resources are linked by at least one dependency, the resources including at least one source resource and at least one target resource, each of the at least one dependency specifying preconditions on at least one of the at least one source resource for the dependency to be activated and an impact on at least one of the at least one target resources when the dependency is activated. A propagation component propagates a change to one of the plurality of resources to at least one other of the plurality of resources in the dependency graph. An output component which outputs information based on the propagation. A processor implements the propagation component and the output component.

In accordance with another aspect of the exemplary embodiment, a method for change management is provided. The method includes providing a dependency graph as an instantiation of a linked resource model in which a plurality of resources are linked by at least one dependency. The resources include at least one source resource and at least one target resource. Each of the at least one dependency specifies preconditions on at least one of the at least one source resource for the dependency to be activated, an impact on at least one of the at least one target resource when the dependency is activated, and an intention of the dependency. A change is propagated to one of the plurality of resources to at least one other of the plurality of resources in the graph. The propagating includes applying at least one of a forward chaining mechanism configured for propagating a change from a source resource to a target resource linked to the source resource by a dependency to satisfy a given intention, and a backward chaining mechanism configured for propagating a change from a target resource to a source resource linked to the target resource by a dependency to satisfy a given intention. Information based on the propagation is output.

One or more of the steps of the method can be performed with a processor.

BRIEF DESCRIPTION OF THE DRAWINGS

FIG. 3 illustrates specifying dependencies in accordance with one aspect of the exemplary embodiment;

FIG. 4 illustrates specifying dependencies in accordance with another aspect of the exemplary embodiment;

FIGS. 10-11 illustrate example code for a transformation dependency;

FIGS. 12A, 12B and 13 illustrate example code for a rendering dependency;

FIG. 14 gives a partial snapshot of a knowledge base at different times during change propagation;

DETAILED DESCRIPTION

Aspects of the exemplary embodiment relate to an object preservation system and method which consider the preservation of a collection of interdependent digital objects, in conformance with context related information. The digital objects are assumed to exist within a continually changing environment, which may result in them becoming unusable over time. Rather than considering the objects individually, the collection of digital objects is considered as a Linked Resource Model of digital objects. In the model, links between the objects represent their dependencies. The links include context-related information. A change that influences one of the objects can then be propagated to the rest of the objects via an analysis of the represented dependencies. A change propagation algorithm can thus take into account the context, encoded in dependency-specific properties. Intent and dependencies are modeled as explicit, "first-class citizen" nodes in the graph (or linked resource model (LRM)), rather than simply as edges between data objects. The entities shown as nodes of the LRM thus include objects, intent and dependencies.

Algorithms are provided for forward and backward nested transactions that traverse all types of graph entities: dependencies, intent, and so forth. The forward transactions allow embedding of many different types of relationships in the same graph and facilitate richer reasoning and analysis with the appropriate ontologies, propagating change over the whole graph. The backward transactions allow propagating change, even locally, i.e., to a subgraph that is included in the whole dependency graph, and also investigating the effects of a given change on a specific data object. This enables performing simulations of the effects of changes in the graph, and for analyzing the impact of changes on a given node.

1. Representation Model

Figure 1:
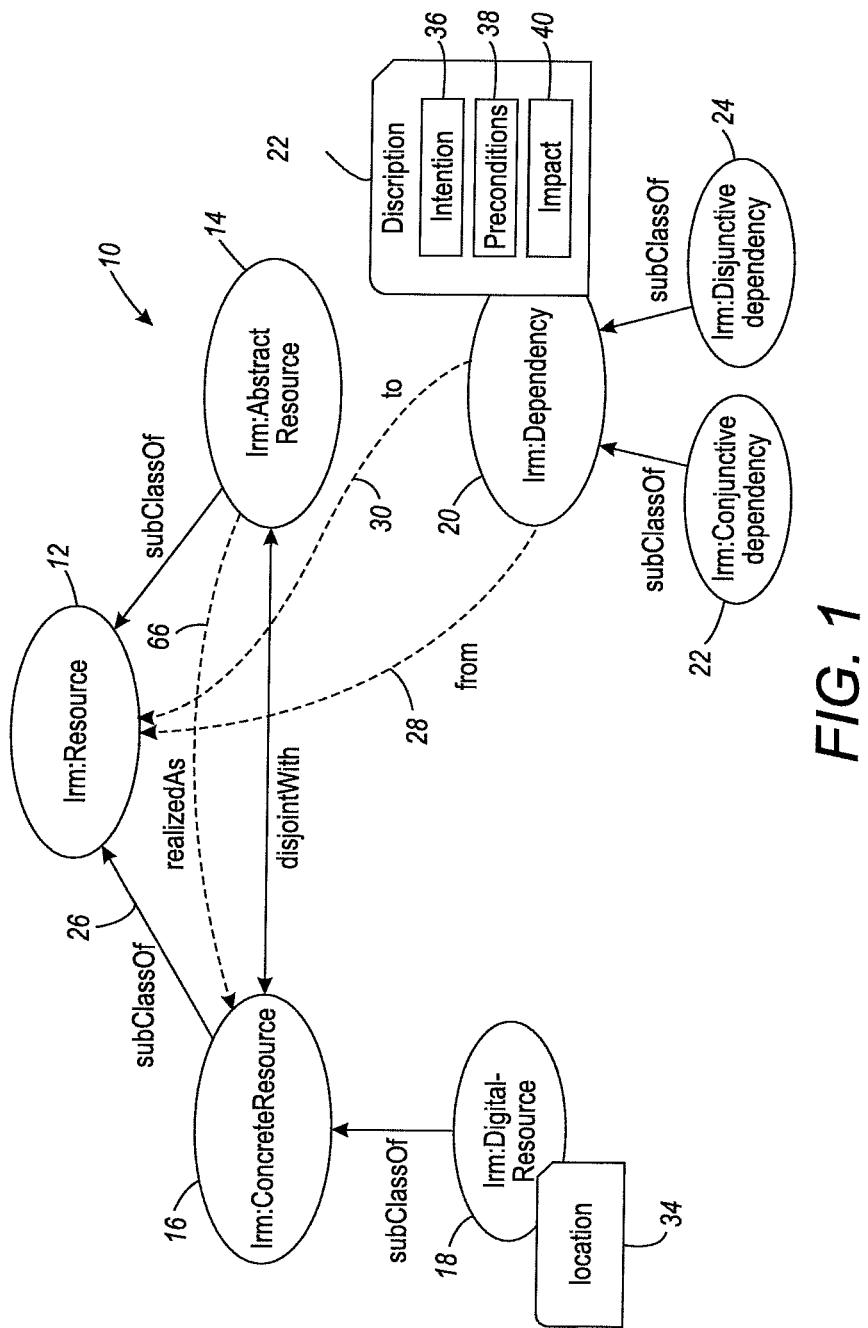
FIG. 1 is a schematic diagram illustrating components of a linked resource model (LRM)

FIG. 1 illustrates the components of a Linked Resource Model (LRM) 10. Objects in the model include objects 12 that represent external resources (and their subclasses 14, 16, 18) and also objects 20 that represent dependencies (and their subclasses 22, 24). Each object is represented as a node. In some cases, the nodes are connected by directional subclass edges 26 that identify the relationships between classes of node. In the model 10, dependencies 20 are linked to other objects (which can be resources, or in some cases, other dependencies), illustrated by from and to dependency directional edges (shown as dashed lines) 28, 30. Each of the dependency nodes 20 is labeled with a corresponding description 32 of the node which describes the context: the preconditions for activating the dependency, its intent, and the other nodes which will be involved.

To illustrate a concrete representation of these concepts, an ontology may be encoded in the OWL 2 Web Ontology Language. The prefix lrm refers to the Linked Resource Model namespace, e.g., a unique identifier of the respective entity that semantically defines it in a formal manner. This allows dynamic information to be recorded and acted upon via a change propagation algorithm that is conditioned on the represented contextual parameters.

OWL 2 is an ontology language for the Semantic Web with formally defined meaning. OWL 2 ontologies provide classes, properties, individuals, and data values and are stored as Semantic Web documents. OWL 2 ontologies can be used along with information written in Resource Description Framework (RDF) and OWL 2 ontologies themselves are primarily exchanged as RDF documents. As will be appreciated, other ontology languages may alternatively be used.

The LRM 10 enables representing a preservation ecosystem (i.e., all objects to be preserved and their interconnections) in terms of the corresponding preservation/usage context. The LRM is an upper level ontology designed to provide a principled way to modelling evolving ecosystems, focusing on aspects related to the changes taking place. This means that, in addition to providing a preservation model that aims to ensure that records remain accessible and usable over time, the LRM also aims to model how changes to the context, and their impact, can be captured. It is assumed that a change policy governs, at all times, the dynamic aspects related to changes (e.g., conditions required for a change to happen and/or impact of changes). As a consequence, the properties of the LRM are dependent on the policy being applied. Therefore, most of the defined concepts are related to what the policy expects. The LRM defines the ecosystem by means of participating entities and dependencies among them. It also provides a set of other properties and specialized entity types are also provided, but these are all conditioned on what is allowed/required by the policy.

Aspects of the model 10 will now be described in greater detail.

1.1 Resource

The concept of Resource 12 in the LRM 10 represents any physical, digital, conceptual, or other kind of entity and in general comprises all things in the universe of discourse of the LRM Model. A resource can be in the class Abstract (see AbstractResource 14 in FIG. 1), representing the abstract part of an entity, for instance the idea or concept of an artwork, or Concrete (see ConcreteResource 16 in FIG. 1), representing the part of an entity that has a physical extension and can therefore be accessed at a specific location. A corresponding attribute 34 of the resource called location can be used to specify spatial information. For example, for a Digital-resource 18, which represents objects with a digital extension, this information can be the URL used to retrieve and download the corresponding bit stream. Alternatively, they could be stored in local memory. Concrete resources 16 may also be physical objects, such as viewable works of art, telephone systems, computers, printers, etc. Other abstract resources 14 could be processes.

The two concepts 14, 16 can be used together to describe a resource. For example, the abstract resource 14 could be the idea of an artwork, as referred to by papers talking about the artist's intention behind a created object, and the concrete resource 16 could be the corresponding video stream that can be loaded and played in order to manifest and perceive the artwork. To achieve that, the abstract and concrete resources can be related through a specific realizedAs predicate 36, which in the illustrated example could be used to express that the video file is a concrete realization of the abstract art piece. In some cases, an abstract resource 14 may be connected to more than one concrete resource 16. In that case, the concrete resources may be aggregated. For example, a class AggregatedResource is defined in the LRM, although not shown in FIG. 1, and the realizedAs predicate could then be used to connect the abstract resource to the aggregated class of concrete resources.

The disjointwith double arrow indicates that concrete resources are not abstract resources, and vice versa, i.e., they are different and do not intersect. The prefix lrm: represents the prefix of the unique identifier of the respective object, and can be a sequence of characters.

1.2 Dependencies

An LRM dependency 20 describes the context under which a change in one or more objects has an impact on other objects of the ecosystem. The dependency 20 is treated as any other object in the model in that it can be associated with other information and can also be related to other objects, including other dependencies.

For example, consider a resource 12 such as a digital document containing a set of diagrams (i.e., a concrete resource of the subclass digital resource 18) that has been created using a version of MS Visio, and that a corresponding change policy defines that MS Visio drawings should be periodically backed up as JPEG objects by the work group who created the set of diagrams in the first place.

According to the change policy, the work group who created the set of JPEG objects should be able to access but not edit the corresponding objects. In this example, the classes and properties related to the Dependency class 20 are used to describe each such conversion in terms of its temporal information and the entities it involves along with their roles in the relationship (i.e., person making the conversion and object being converted, in this case).

The description 32 of a dependency 20 therefore includes the intent or purpose related to the corresponding usage of the involved entities. From a functional perspective, it is contemplated that dedicated policies/rules may be stored which further refine the context (i.e., conditions, impacts) under which change is to be interpreted for a given type of dependency.

Conjunctive and Disjunctive Dependencies.

Explicit classes may also be defined for representing conjunctive and disjunctive dependencies 22, 24. In the case that a conjunctive dependency 22 is used, then if any of the resources related to that dependency, via the lrm:from property, is changed then the dependency is "activated," or in other words the corresponding impact can be computed. Thus, if a source resource is changed, the corresponding target resource is also changed. In the case of disjunctive dependencies 24, all resources at the source of the lrm:from properties should be changed for a dependency to be activated. Of course, this has repercussions on the inference related to the calculation of the impact and corresponding change propagation within the network of dependencies, as explained below.

The dependencies are thus not limited to binary dependencies where a single entity node representing a source object is linked to a respective node representing the changed object but can be n-ary with respect to one or both of the from and to objects.

1.3. Contextualizing Dependencies

Figure 2:
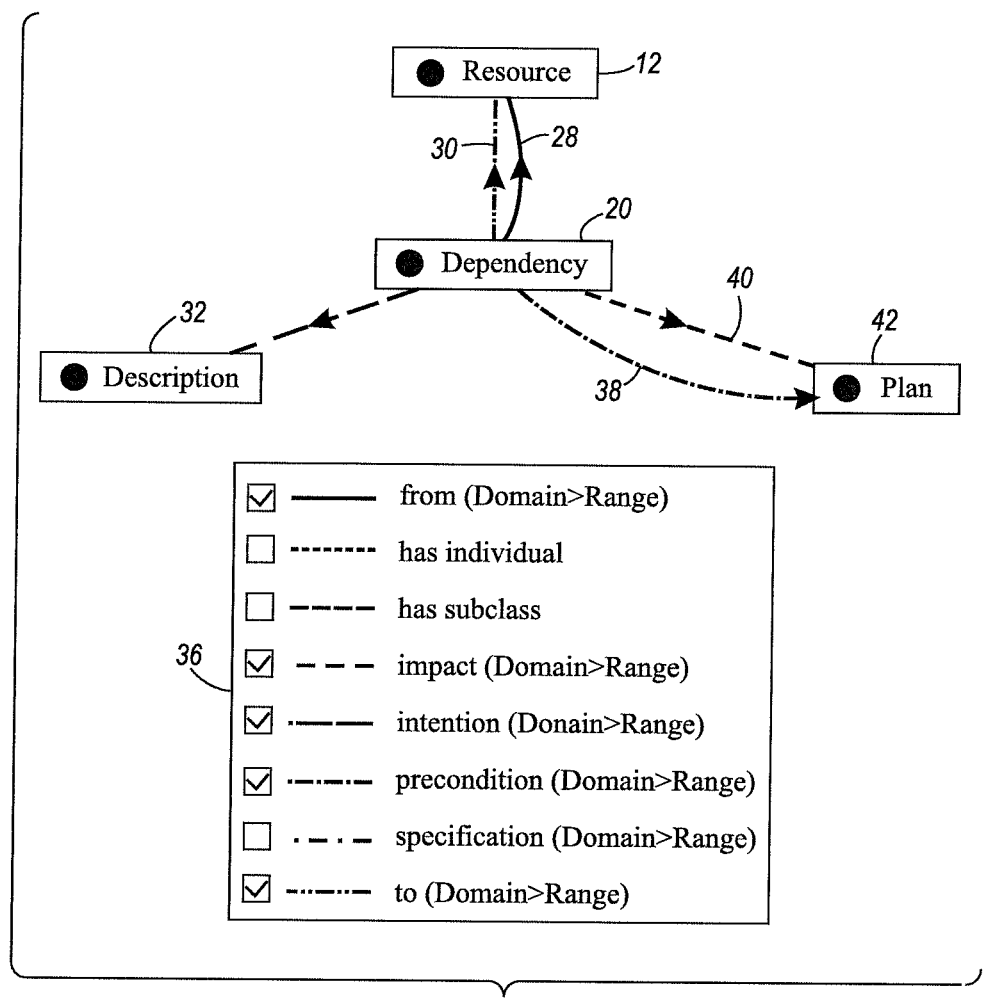
FIG. 2 is a representation of intentions and dependencies in the LRM.

As shown in FIG. 2, each dependency 20 can be contextualized with information which describes the from (source) and to (target) objects (Domain>Range), which may be further specified by individual or subclass, the intent of the dependency, such as to ensure that a new target resource is created under certain preconditions, the impact of the dependency when it is activated, such as the creation or modification of a resource, the preconditions under which the dependency is activated.

1.3.1. Intent

The LRM Dependency 20 is specifically defined according to the intent underlying a specific change. In the example case described above, the intent may be described as "The work group who created the set of diagrams wants to be able to access (but not edit) the diagrams created using MS Visio. Therefore, the work group has decided to convert these diagrams to JPEG format." This intent implies the following.

1. There is an explicit dependency between the MS Visio objects and JPEG objects. More specifically, the JPEG objects are dependent on the MS Visio ones. This means that if an MS Visio object 'MS1' is converted to a JPEG object, 'JPEG1', and 'MS1' is edited, then 'JPEG1' should either be updated accordingly or another JPEG object 'JPEG2' should be generated and 'JPEG1' may be deleted (depending on the policy). This dependency would be particularly useful in a scenario where MS Visio keeps on being used for some time in parallel to the JPEG entities, which are, in turn, used for back up purposes.

2. The dependency between 'MS1' and 'JPEG1' is unidirectional. Specifically, the JPEG objects are not allowed to be edited and, if they are, no change to the corresponding MS Visio objects should be applied.

The dependency, in this case, applies to the specific work group, which means that if a person from another work group modifies one of the MS Visio objects, no specific conversion action has to be taken (the action should be defined by the corresponding policy). To enable recording the intent of a dependency, in the LRM, the Dependency entity 20 is related to an entity that describes the intent via a property that is referred to as "intention," as illustrated in FIG. 2. In FIG. 2, the from and to properties 28, 30 indicate the directionality of the dependency. A subclass 36 of the Description class 32 is defined that is referred to as Intention. This subclass represents all intention instances.

1.3.2. Preconditions and Impacts

The LRM 10 also provides concepts that allow recording when a change is triggered and what is the impact of this change on other entities. Considering the above example again, it is desired to be able to express the fact that transformation to JPEG objects is possible only if the corresponding MS Visio objects exist and if the human that triggers the conversion has the required permissions to do that (i.e., belongs to the specific workgroup). The impact of the conversion could be to generate a new JPEG object or update an existing one. The action to be taken (i.e., generate or update) in that case, would be decided based on the policy governing the specific operation. Assuming that only the most recent JPEG object must be archived, then the old one must be deleted and replaced by the new one (conversely deciding to keep the old JPEG object may imply having to archive the old version of the corresponding old MS Visio object as well).

The precondition(s) and impact(s) of a change operation are connected to the Dependency 20 in LRM via precondition and impact properties 38, 40, as illustrated in FIG. 2. These connect a Dependency to a plan 42, which represents a set of actions or steps to be executed by someone/something (human or software or both). The plan can therefore be used as a means of giving operational semantics to dependencies. Plans can describe how preconditions and impacts are checked and implemented (this could be defined, for example, via a formal rule-based language, such as SWRL, see Benjamin Grosof, et al., "Description Logic Programs: Combining Logic Programs with Description Logic," Proc. WWW2003, Budapest, May 2003, and Benjamin Grosof, et al., "SWRL: A Semantic Web Rule Language Combining OWL and RuleML, available at https://www.w3.org/Submission/SWRL/).

1.3.3. Specializing Dependencies Based on Intentions, Preconditions, and Impacts One of the strengths of having the dependency notion represented as a class is that the inference mechanisms of a web ontology language, such as OWL, can be used to specialize it, according to the intents, impacts, and preconditions that define it. Take the example of expressing a dependency 20 that defines that the validation of an XML file is dependent on the XML schema and the impact is having a validation report. The corresponding XML validation dependency can be defined as follows:

ex:XmlValidation rdfs:subClassOflrm:ConjunctiveDependency.

To specialize this dependency according to the specific intents, preconditions, and impacts, one of the following approaches can be employed:

1. Specialize the Description and Plan classes 32, 42 accordingly and then connect the dependency to the specialized classes. This can be done in a resource description framework (RDF), in a suitable format, such as Turtle (Terse RDF Triple Language). See, David Beckett, et al., "RDF 1.1 Turtle—Terse RDF Triple Language Turtle," World Wide Web Consortium (W3C), 25 Feb. 2014. Retrieved, 16 Dec. 2015. For example FIG. 3 shows how this example could be expressed in Turtle. This can be an appropriate method if the classification inference supported by OWL, for example, is used.

2. Specialize the Dependency by linking it to a specific instantiation of the Description and Plan classes 32, 42 that is specific to this class. For instance, rewriting the example above could be as shown in FIG. 4 (again in Turtle). This may be the most appropriate method in the case that an inference mechanism that is specialized on managing instances is used, as it avoids excessive proliferation of classes.

3. Hybrid approaches that combine the two methods described above.

Using any of the above three specialization mechanisms enables contextualizing and defining dependency classes and corresponding instances, according to the intentions, preconditions, and impacts that characterize them.

Figure 5:
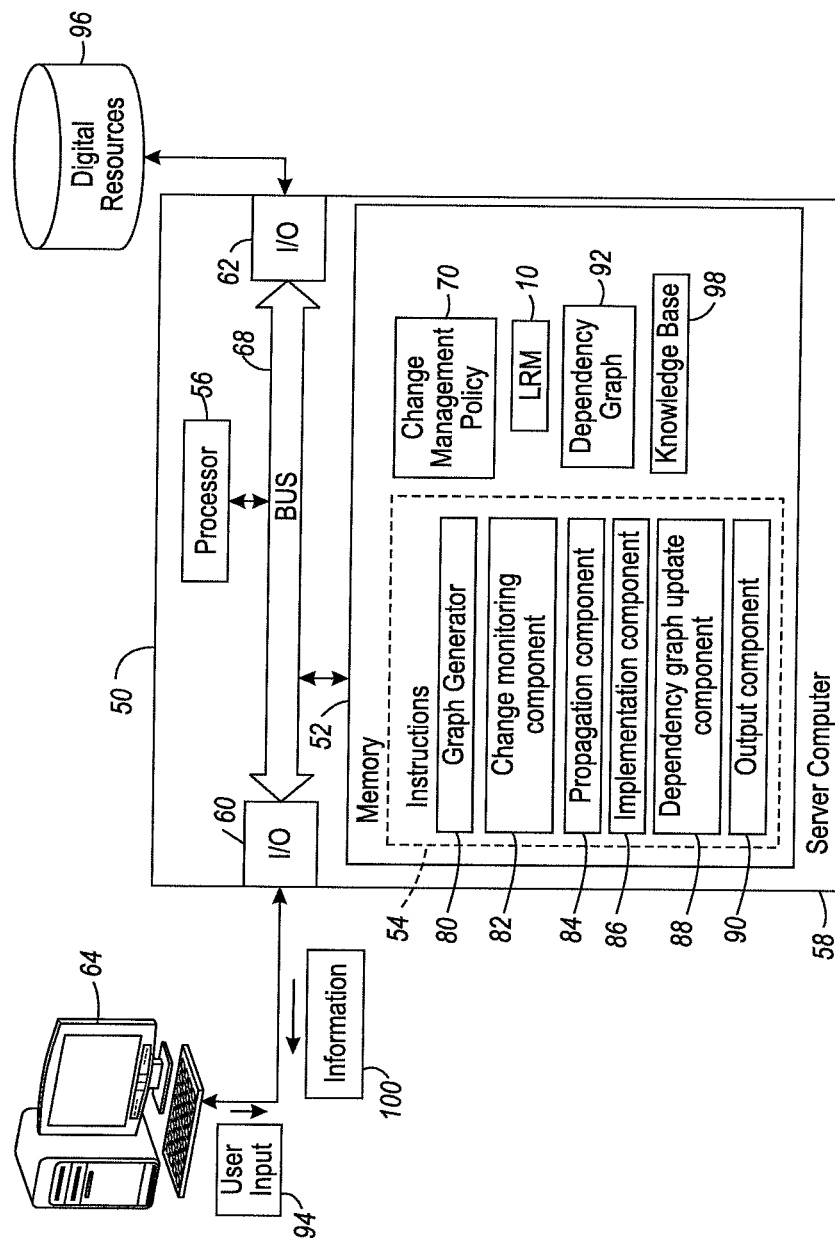
FIG. 5 is a functional block diagram of a system for managing changes in a collection of data objects in accordance with one aspect of the exemplary embodiment.
Figure 6:
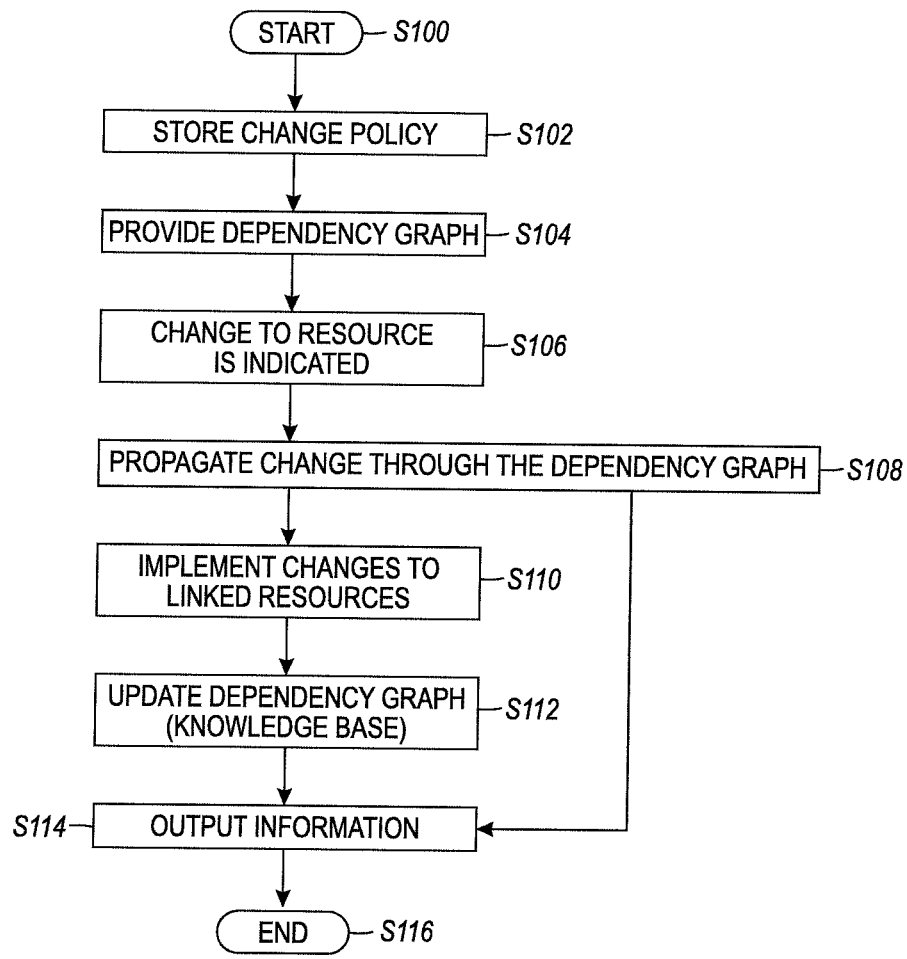
FIG. 6 is a flow chart illustrating a method for managing changes in a collection of data objects in accordance with another aspect of the exemplary embodiment.

FIG. 5 illustrates a system 50 for change management which is configured for implementing and/or detecting changes in a network of objects as further described with respect to FIG. 6. The system includes memory 52, which stores software instructions 54 for implementing the method described with reference to FIG. 6, and a processor 56 in communication with the memory for executing the instructions. The system may be hosted by one or more computing devices, such as the illustrated server computer 58. One or more input/output devices 60, 62 are provided which allow the system to communicate with external devices 64, e.g., via a wired or wireless connection(s) 66, such as a local area network or a wide area network, such as the Internet. Hardware components 52, 56, 50, 62 of the system communicate via a data/control bus 68.

The memory 52 may represent any type of non-transitory computer readable medium such as random access memory (RAM), read only memory (ROM), magnetic disk or tape, optical disk, flash memory, or holographic memory. In one embodiment, the memory 52 comprises a combination of random access memory and read only memory. In some embodiments, the processor 56 and memory 52 may be combined in a single chip. Memory 52 stores instructions for performing the exemplary method as well as the processed data.

The network interface 60, 62 allows the computer to communicate with other devices via a computer network, such as a local area network (LAN) or wide area network (WAN), or the internet, and may comprise a modulator/demodulator (MODEM) a router, a cable, and/or Ethernet port.

The digital processor device 56 can be variously embodied, such as by a single-core processor, a dual-core processor (or more generally by a multiple-core processor), a digital processor and cooperating math coprocessor, a digital controller, or the like. The digital processor 56, in addition to executing instructions 54 may also control the operation of the computer 58.

The term "software," as used herein, is intended to encompass any collection or set of instructions executable by a computer or other digital system so as to configure the computer or other digital system to perform the task that is the intent of the software. The term "software" as used herein is intended to encompass such instructions stored in storage medium such as RAM, a hard disk, optical disk, or so forth, and is also intended to encompass so-called "firmware" that is software stored on a ROM or so forth. Such software may be organized in various ways, and may include software components organized as libraries, Internet-based programs stored on a remote server or so forth, source code, interpretive code, object code, directly executable code, and so forth. It is contemplated that the software may invoke system-level code or calls to other software residing on a server or other location to perform certain functions.

A change policy 70 is stored in memory 52, which defines changes which are to be made to one or more of a set of linked resources 12. The specific linked resources are connected by dependencies 20 in a dependency graph 92, which is an instantiation of the general LRM 10. See, for example, FIGS. 7-9.

The instructions 54 may include a dependency graph generator 80, a change monitoring component 82, a propagation component 84, optionally, an implementation component 86, a dependency graph update component 88, and an output component 88.

The graph generator 80 generates a dependency graph 92 as a specific instantiation of the LRM 10 for a set of linked resources, e.g., based on user inputs 94. In some embodiments, the generation of the dependency graph 92 may be performed wholly or partly elsewhere, e.g., by an operator of the remote computing device 64, and then input to the system.

The change monitoring component 82 monitors changes to the linked resources 12 represented in the graph. For example, the system 50 is notified when a change to one of the external resources 96 represented in the graph is to be or has been performed. The propagation component 84 propagates the change through the dependency graph 92 to identify other resources that are impacted by the change, via the dependencies 20. The changes to the dependency graph may be stored in a knowledge base 98 by the dependency graph update component 88. The implementation component 86 may implement changes on one of the external resources 96 corresponding to one or more of the other linked resources, if this is specified in the output of the propagation component (in some cases, no change may be needed). The output component outputs information 100 based on the output of the propagation component 84 and/or implementation component 86.

FIG. 6 illustrates a change management process which can be performed with the system of FIG. 5. The method begins at S100.

At S102, a change policy is stored.

At S104, a dependency graph 92 is provided (instantiated and/or stored) for a network of linked resources which complies with the linked resource model 12.

At S106, a change to one of the resources in the linked dependency graph is indicated. In one embodiment, the system is notified that a change has occurred in one of the external resources represented in the dependency graph. In another embodiment, the system is notified that a change to one of the external resources needs to be made. In another embodiment, the system may be proactive and ask periodically, for changes that have been made to the external resources, e.g., once a day, or at more or less frequent time intervals.

At S108, the change is propagated through the dependency graph, e.g., using a forward and/or backward change algorithm, as described in further detail below, to detect other resource(s) impacted by the change. The exemplary forward chaining mechanism propagates a change from a source resource to a target resource that is linked to the source resource by a dependency, only when the preconditions and impact of the dependency are determined to satisfy the intention. The exemplary backward chaining mechanism propagates a change from a target resource to a source resource linked to the target resource by a dependency, only when the preconditions and impact are determined to satisfy the intention of the dependency. The propagation can include applying both the forward and backward chaining algorithms, e.g., one after the other and/or for a plurality of iterations.

At S110, changes to other linked resources may be implemented, according to the change policy 70. These changes may be implemented by the implementation component 86, either locally, or on a remote server. The changes to the resources are recorded and may be used to update the dependency graph (S112). For example, if a source document is changed and the result of the propagation is an updated target document, the URLs for the new target and source documents may be linked to the respective source and target resource nodes 12 in the graph. These changes to the dependency graph may be stored in the knowledge base 98, which is updated over time.

At S114, information 100 is output, such as the implemented changes or instructions that the changes should be made in accordance with the change policy.

The method ends at S116.

The method illustrated in FIG. 6 may be implemented in a computer program product that may be executed on a computer. The computer program product may comprise a non-transitory computer-readable recording medium on which a control program is recorded (stored), such as a disk, hard drive, or the like. Common forms of non-transitory computer-readable media include, for example, floppy disks, flexible disks, hard disks, magnetic tape, or any other magnetic storage medium, CD-ROM, DVD, or any other optical medium, a RAM, a PROM, an EPROM, a FLASH-EPROM, or other memory chip or cartridge, or any other non-transitory medium from which a computer can read and use. The computer program product may be integral with the computer 58, (for example, an internal hard drive of RAM), or may be separate (for example, an external hard drive operatively connected with the computer 30), or may be separate and accessed via a digital data network such as a local area network (LAN) or the Internet (for example, as a redundant array of inexpensive of independent disks (RAID) or other network server storage that is indirectly accessed by the computer 58, via a digital network).

Alternatively, the method may be implemented in transitory media, such as a transmittable carrier wave in which the control program is embodied as a data signal using transmission media, such as acoustic or light waves, such as those generated during radio wave and infrared data communications, and the like.

The exemplary method may be implemented on one or more general purpose computers, special purpose computer(s), a programmed microprocessor or microcontroller and peripheral integrated circuit elements, an ASIC or other integrated circuit, a digital signal processor, a hardwired electronic or logic circuit such as a discrete element circuit, a programmable logic device such as a PLD, PLA, FPGA, Graphical card CPU (GPU), or PAL, or the like. In general, any device, capable of implementing a finite state machine that is in turn capable of implementing the flowchart shown in FIG. 6, can be used to implement the method. As will be appreciated, while the steps of the method may all be computer implemented, in some embodiments one or more of the steps may be at least partially performed manually. As will also be appreciated, the steps of the method need not all proceed in the order illustrated and fewer, more, or different steps may be performed.

Further details of the system and method will now be described.

2. Dynamics of the Representation System

2.1. Interpreting Dependencies

As described earlier, dependencies 20 are particular objects connecting one or several other objects (designated by the lrm:from property 28) to one or several other resources (designated by the lrm:to property 30). This connection is oriented, and is associated with an intention 36, i.e., an action semantics that characterizes the dependency 20.

Additionally, two other attributes are attached to dependencies: the precondition 38, which describes the contextual properties that need to hold in order to consider the dependency as "activated", and the impact 40, which describes what must be done when the dependency is activated.

Two particular sub-classes of dependencies can be distinguished:

1. conjunctive dependencies 22: all source resources are required together and simultaneously to evaluate the impact of a change on the target resource(s). It means that if one or several of the sources has changed (and satisfies the precondition), then the target resources must change accordingly, 2. disjunctive dependencies 24: the target resource(s) just depends on one of the source resources. It means that if there is one input resource that changes, then the target resource(s) needs to change.

These two classes of dependencies and their combination allow for expressing needs related to a strong conjunctive hypothesis (e.g., an XML document, to be transformed, depends on an XML parser, a tree-to-tree transformer, and an XML linearizer) but also expresses the fact that a variety of choices for one or several input constraints are possible (e.g., the XML parser can be chosen among several standard ones, having slight performance differences, but providing identical functionality).

Figure 7:
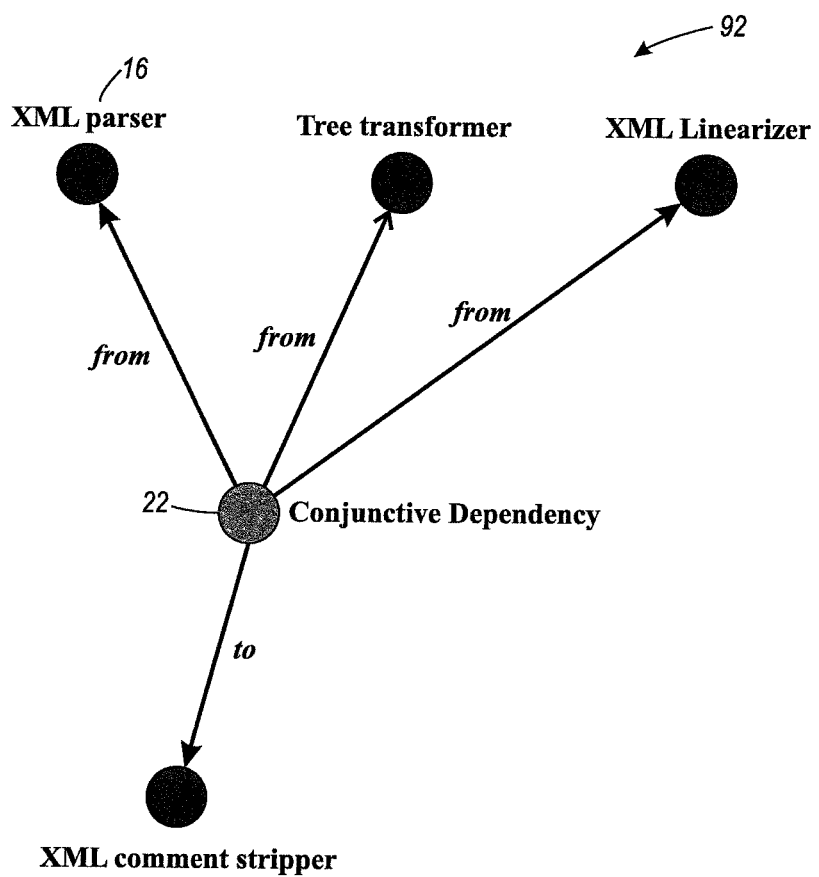
FIG. 7 illustrates an example case of a conjunctive dependency.
Figure 8:
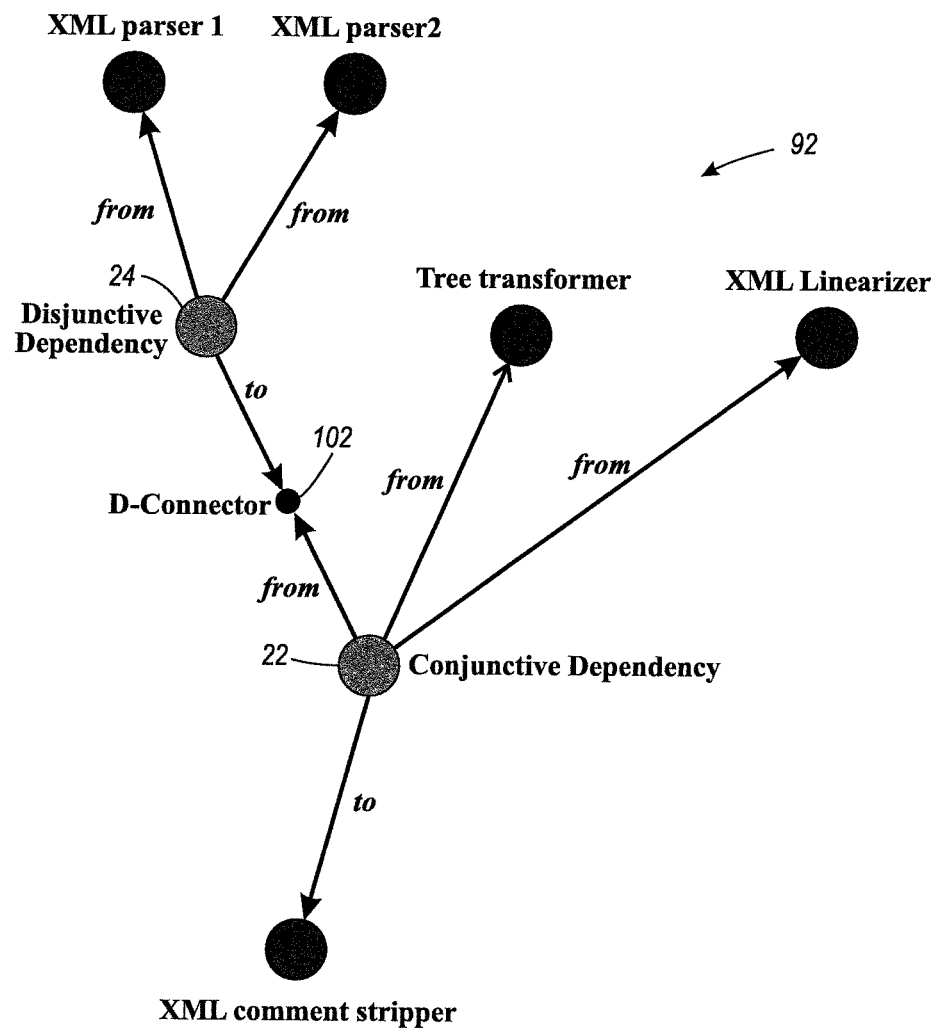
FIG. 8 illustrates an example case of a composite dependency in which a combination of a conjunctive and a disjunctive dependency is used.

Given the preconditions and types of dependencies, a dependency graph 92 can be built which is a specific instantiation of the LRM model 10. FIG. 7 is a dependency graph 92 which illustrates the case of a simple conjunctive topology. This graph indicates that all three resources: an XML parser, a tree transformer, and an XML linearizer are required as input resources. A change in any one of them, e.g., the XML parser stops working, means the dependency 22 cannot be satisfied. FIG. 8 is a dependency graph 92 which illustrates the case where a combination of a conjunctive and a disjunctive dependency allows expressing more complex configurations. In the case of FIG. 8, for example, the dependency graph shows that a source resource selected from XML parser 1 and XML parser 2 is required, but since they are joined by a disjunctive dependency, only one is required. Thus, the disjunctive dependency 24 is satisfied if there is a change resulting in XML Parser 1 being inoperative. As for FIG. 7, however, an XML parser (either one is sufficient), a tree transformer, and an XML linearizer are all required as inputs to conjunctive dependency 22 for the target resource, XML comment stripper, to be operative.

The composition of two or more dependencies can be achieved through particular objects types with the class dependency connector (D-Connector), as illustrated by node 102 in FIG. 8. The D-Connector has no other particular semantics than being "virtual" intermediate resources that are used to propagate the change information in a homogenous way, and therefore, simplifying the algorithms presented in the following sections. In this way, a first dependency can be linked to a second dependency via a D-connector 102, without any intervening resource nodes.

Edges between two dependencies are directed with to and from properties, in the same as for edges between a resource node and a dependency node. Thus, the order in which the dependencies are to be applied is clear from the direction of the edges.

Figure 9:
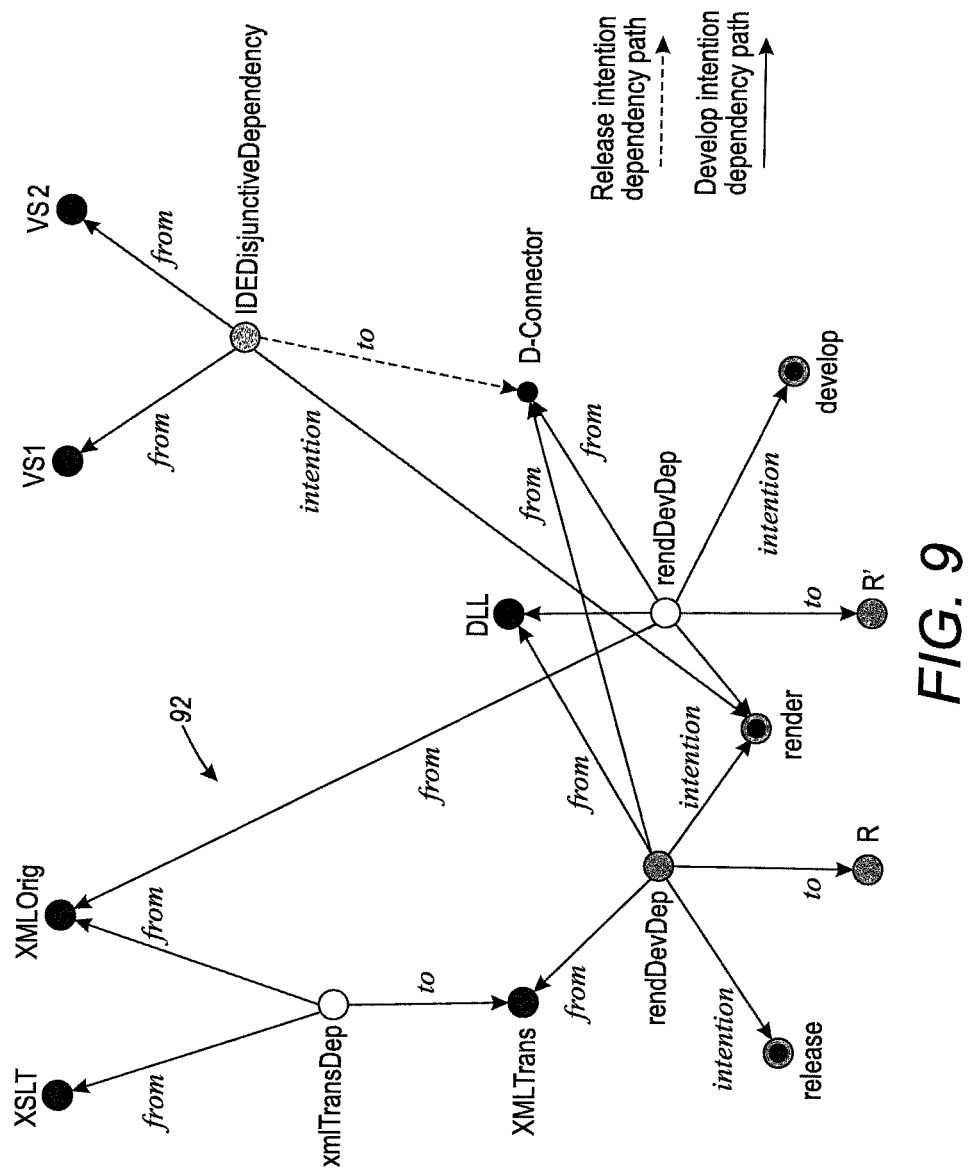
FIG. 9 shows the topology of a dependency graph at time t with three different intentions shown: render, release and develop.

It may be noted that although the dependency graphs shown in FIGS. 7 and 8 have a single target resource, dependency graphs which share one or more of their nodes can be combined to form a more complex graph, as illustrated in FIG. 9, where different paths through the graph have different results, denoted R and R'.

2.2. Transactions and Localized Computations

It is to be expected that changes may sometimes bring about undesirable side-effects. For example, operations that have not successfully terminated can change the state of the actual dependency graph in an incorrect way (i.e., the dependency graph does not represent the actual real dependencies between objects). This is a problem, since after an unsuccessful evaluation of the operation, the state of the dependency graph would be not the same as the initial one. This hinders, for instance, the reproducibility property. Furthermore, asynchronous changes may modify the dependency graph during change propagation, and therefore could introduce problematic and unpredictable behaviors.

It is therefore assumed that: the evaluation of the preconditions and of the impact of changes on a dependency graph relies on a transactional, context-aware mechanism that implements a modification to the initial dependency graph only if the corresponding conditions that are defined in a local context evaluate to true. A context here corresponds to a specific instantiation of the dependency graph 92 that can be implemented for example as an RDF graph (see, RDF 1.1 Concepts and Abstract Syntax, W3C Recommendation 25 Feb. 2014," http://www.w3.org/TR/rdf11-concepts/#section-rdf-graph) or triple store (RDF store) (see, https://en.wikipedia.org/wiki/Triplestore; Rusher, "Triplestore," available at http://www.w3.org/2001/sw/Europe/events/20031113-storage/positions/rusher.html).

A nested transaction mechanism adapted to handle triple stores through a stack-like structure, and based on three standard verbs, can be used for this:

TransactionStart($\mathbb{S}$): Pushes one new entry on the store's stack; each triple addition or deletion will be recorded in this new entry.

TransactionCommit($\mathbb{S}$): Pop the top level entry out of the stack, and add or withdraw all corresponding triples inside the new top level entry (or update the ground store if the stack is empty).

TransactionAbort($\mathbb{S}$): Pop the top level entry out of the stack, and do nothing else (that is, forget everything about the corresponding triples inside the new top level entry).

Reading the triple store means that the stack is coherently exploited (scanning the stack from top level down to ground level—the basic store), and is abstracted through the mathematical relation t∈$\mathbb{S}$. (Where t stands for an RDF triple).

2.3. Context-Aware Change Propagation Over the Global Dependency Graph: Forward Chaining Interpretation Algorithm A forward chaining interpretation algorithm can be used to propagate changes to a resource throughout all depending resources. This is useful when the system is notified of a change to one of the represented resources. In this mode, the change is propagated through the whole representation system by analyzing the dependency graph 92 in a forward fashion. This allows the system to propagate the impact of the change.

First, two procedures are described to handle the change information through the use of a particular instance of the class lrm:ChangeEvent, called lrm:changeMarker (the lrm:ChangeEvent is itself a particular subclass of the lrm:Description class).

Algorithm 1 describes detecting and signaling the change of a resource r inside a triple store $\mathbb{S}$.

---

Algorithm 1: detecting and signaling the change
of a resource r inside a store $\mathbb{S}$ (uses
a predefined instance called lrm:changeMarker)

--- boolean Check-Change($\mathbb{S}$, r) is {return RDF(lrm:changeMarker, lrm:subject, r) ∈ $\mathbb{S}$ }
void Set-Change($\mathbb{S}$, r) is {set RDF(lrm:changeMarker, lrm:subject, r) ∈ $\mathbb{S}$
}

---

The function evaluates to true if there exists an RDF triple in the store $\mathbb{S}$ expressing that the resource r is the subject of a change (which is literally captured by the triple RDF(lrm:changeMarker, lrm:subject, r).

The second function, denoted Set-Change registers that a change has occurred to a resource inside the store. The change is materialized by writing an RDF triple into the store. This triple is compatible with the function described above, in that sense that for any resource r and store $\mathbb{S}$, if Set-Change($\mathbb{S}$,r) transforms $\mathbb{S}$ into $\mathbb{S}'$, then Check-Change($\mathbb{S}'$,r) always evaluates to true.

As described previously, the dependencies in the LRM are defined according to the intended usage of linked resources, which are captured through the property lrm:intention, that points to the class lrm:Intention, which is a subclass of lrm:Description (FIG. 2). Each dependency instance is therefore associated with a particular intention that is analyzed during the interpretation of the dependency graph 92. More precisely, a particular dependency will be selected if and only if its intention is compatible with the target intention that characterizes the graph analysis, and which is one of the input parameters. The compatibility should be checked between the intention locally attached to the dependency and the chaining intention, which is passed as a global parameter of the chaining algorithm.

The procedure outlined in Algorithm 2 below handles this information through calling the underlying RDF inference mechanism to check for class membership. $\mathbb{S} \ni$ t is used to express that the triple t is inferred from the store $\mathbb{S}$.

---

Algorithm 2: checking that a dependency
is compatible with a particular intention

---

// $\mathbb{S}$ is a store, I an Intention descriptor, d a dependency instance
boolean Check-Intention( $\mathbb{S}$, d, I) is
    return RDF(d, lrm:intention, i) ∈ $\mathbb{S}$ and $\mathbb{S} \ni$ RDF(i, rdf:type, I)

---

The Check-Intention function is a Boolean function which checks in the store $\mathbb{S}$ to see if there is an intention descriptor of class I which is associated with a given dependency d. This is true when an RDF triple that includes the dependency d of the particular intention i is found in the store and when the triplet (i, rdf:type, I) can be inferred from the store, i.e., that the intention descriptor i is compatible with the intention descriptor type I.

A recursive method, which reuses the two algorithms 1 and 2, as illustrated in Algorithm 3 below, explores the whole dependency graph starting from the changed resource. Cycles are eliminated by memorizing the resources already explored inside a set M. If a resource is already in the set M, this means it will not be considered again, thereby avoiding the occurrence of never-ending cycles. The triple store is denoted by $\mathbb{S}$ and an RDF triple with subject s, predicate p and object o is denoted by RDF(s, p, o). Two predicates are attached to a dependency d: the precondition and the impact. Both link d to a logical property that must be evaluated as true for the dependency d to be activated. The impact condition is typically expected to have side effects, i.e., to change the context (the RDF store $\mathbb{S}$), and typically the target resource(s). In case of a dependency having no to predicate, the impact condition always evaluates to true (or its absence is evaluated as true).

---

Algorithm 3: propagating the change of a resource,
potentially through the whole dependency graph

--- void FWD-Change($\mathbb{S}$, I, r, M) is
// $\mathbb{S}$ is a store, I an Intention descriptor, r a resource and M is a set to
memorize the exploration path
    if (r ∉ M) {
        set r ∈ M;
        // d is a dependency
        forall d such that RDF(d, lrm:from, r) ∈ $\mathbb{S}$ and
        Check-Intention( $\mathbb{S}$, d, I )
        do {
            TransactionStart ($\mathbb{S}$);
            if precondition( $\mathbb{S}$, d) and impact( $\mathbb{S}$, d) then {
                TransactionCommit ($\mathbb{S}$)
                // tr is a target resource
                forall tr such that RDF(d, lrm:to, tr) ∈ $\mathbb{S}$ do
                Set-Change($\mathbb{S}$, tr)
                forall tr such that RDF(d, lrm:to, tr) ∈ $\mathbb{S}$ do
                FWD-Change($\mathbb{S}$, I , tr , M)
            }else
                TransactionAbort ($\mathbb{S}$)
    }
}

---

In Algorithm 3, the algorithm identifies RDF triples in which r is a source resource for a dependency d (i.e., is connected to the dependency by a from property) and also checks that the intention is compatible with the dependency. If this is the case, then all the target resources tr that are linked to the source resource r are changed. The change to a target resource tr can then be propagated to other resources by considering the changed target resource as r in the next execution of the algorithm 3 through a standard recursive call mechanism.

The algorithm starts with an empty set of forward changes. The first step of Algorithm 3 involves checking that a resource r in the dependency graph is not yet in the set of already considered resources M. If this is the case, then r is added to the set M (otherwise, no further action is taken for resource r). Then, for each dependency d that has a RDF triple in the store $\mathbb{S}$ with a from property with respect to r, and where the dependency d is compatible with the intention I (i.e., using the Check-Intention function in Algorithm 2), the algorithm moves to the TransactionStart step, in which a new context is pushed on the store's stack; each triple addition or deletion will be recorded in this new context. If the precondition and impact of the dependency d are satisfied, then the transaction is considered to be activated. The change in r is then propagated to all target resources tr that are linked to the source resource r by that dependency d using the Set-Change function from Algorithm 1, and by calling the FWD-Change function recursively using all tr resources. If the precondition and impact of a dependency are satisfied, then the transaction is aborted without making changes to the target resources or to the store. The transactions are nested because of the recursive nature of the algorithm.

It may be noted that Algorithm 3 handles composite dependency graphs correctly, provided that the preconditions associated with the dependency node check for the disjunctive or conjunctive conditions among the source entities connected to that dependency. In the example of FIG. 8, for example, a change to the "XML Parser 1" resource will be propagated to the "comment stripper" resource (typically, the associated impact would be building a new executable object) only if the precondition attached to the Disjunctive Dependency node 24 analyzed that the "XML Parser 2" node changed too.

2.4. Context-Aware Change Propagation for Targeted Resource (Local) Updating: A Backward Chaining Interpretation Algorithm The forward chaining algorithm presented in the section 2.3 propagates the changes to the whole dependency graph. The backward chaining algorithm enables examining a particular resource r and searching to determine if it is impacted by one or several changes that may have occurred, exploiting the knowledge stored in the upstream dependency graph. Cycles are handled through the same marking mechanism used in Algorithm 3. The backward chaining algorithm is particularly useful for analyzing proposed changes.

This mechanism is powerful, but more complex to handle, because the non-monotonicity of the change computation: local decisions taken during the exploration of the dependency graph may have a global effect, and therefore, may impact future precondition evaluations. Hence, there is a major difference from the forward chaining algorithm: actions associated with each dependency must be undertaken locally during the backtracking process (when preconditions are satisfied), but as they will not necessarily be retained at the end of the process, so they must be reversible. To offer this property, the nested transaction mechanism described in section 2.2 may be employed.

A backward chaining method is illustrated in Algorithm 4. Note that the behaviors of disjunctive and conjunctive dependencies are captured inside the respective precondition actions.

---

Algorithm 4: propagating the resource update
through the whole dependency graph

--- boolean BWD-Change( $\mathbb{S}$ , I , r , M) is // $\mathbb{S}$ is a store, I an Intention descriptor, r a resource ,and M is a set to memorize the exploration path

---

-continued

---

Algorithm 4: propagating the resource update
through the whole dependency graph

---

```
var changed : Boolean = false
    if Check-Change( 𝕊 , r) then {changed := true}
    else {
        if not (r ∈ M) then {
        set r ∈ M; changed := false;
        TransactionStart ( 𝕊 );
        // d is a dependency
        forall d such that RDF(d, lrm:to, r) ∈ 𝕊 and
              Check-Intention( 𝕊 , d, I ) ∈ 𝕊 do {
            // sr is a source resource
            forall sr such that RDF(d, lrm:from, sr) ∈ 𝕊 {
                if BWD-Change( 𝕊 , I , sr , M) then
                    changed := true
            }
            if changed then
                changed := precondition( 𝕊 , d) and impact( 𝕊 ,d)
            if changed then break
        }
        if changed then TransactionCommit ( 𝕊 )
        else TransactionAbort ( 𝕊 )
            unset r ∈ M
        }
    }
return changed
```

---

The backward chaining algorithm considers r as a target object and looks first if any direct changes have been declared. If none, the Algorithm considers the possibility that indirect changes might be detected and examines the source objects linked to r by a dependency to determine if they have changed. If any one of the source objects has changed, and the preconditions of the dependency are met, then it is assumed that r has also changed: its contextual impacts are evaluated and if successful, will be recorded through the TransactionCommit operation.

The first step in Algorithm 4 considers a specific resource r and checks whether a backward change to r has been observed, using the check-change function of Algorithm 1. If this function is true (i.e., a change has been detected), then a variable called changed is set to true and the algorithm returns that the resource is changed. This is the simple case. The algorithm also takes into account that the check-change function only recognizes direct (obvious) changes. Accordingly, if no direct change is detected, the algorithm adds r to the set M, for the reasons discussed earlier, and proceeds to the step TransactionStart. Then, for all dependencies d where an RDF triple has d related to r by a to property (i.e., r is the target object in the triple) and the Check-Intention function is met, i.e., the intention is compatible with the dependency, then for all source resources sr where there is an RDF triple in the store $\mathbb{S}$ in which the source resource has a from property for that dependency, a check is made to see if a backward change is true. If these are all true, it can be inferred that a change has been made to r, so the changed variable is set to true. Then the preconditions and impacts are evaluated to determine the changes to r. It is not necessary to check all dependencies involving r—if one dependency results in a change, the method breaks at this point and the transaction is made in the transaction commit stage. If none of the dependencies connected to r by a to property results in a change to r then the transaction is aborted. In this case, however, r is removed from the set M and may be reconsidered in a subsequent iteration, allowing changes to r to be reversible. In some embodiments, when a change is detected in r by Algorithm 4, the method may proceed to Algorithm 3, with r being treated as a source object.

It may be noted that a resource may be impacted by several dependencies. In that case, there is no predefined assumption about the consistency of the result of Algorithm 4. Inconsistencies may appear, for example, if one action updates the target resource, while another action originating from another upstream graph deletes the resource. The basic algorithm above applies all relevant actions (regarding the topology and preconditions), regardless of their global consistency or inconsistency. To ensure coherence, the structural properties of the dependency graphs can be worked out at the level of the change management policy.

As will be appreciated, the dependency graph can be used to determine which resources will be affected by a given change. This can be done without the need to implement the actual changes on the external resource 96.

The dependency graph 92 can also be used to identify a corrective action that needs to occur in order for dependencies which are unable to be activated due to a change to be activated once more. For example, in FIG. 2, if the tree transformer is changed to an inactive state, then the propagation of this change through the graph will result in the conditions for the conjunctive dependency 22 not being met. The output component could then output information 100 that the tree transformer needs to be made functional in order for the XML comment stripper to be implemented.

3. Illustrative Examples

The advantages of the exemplary method over a method that does not take intent and context into account can be illustrated with the following example.

3.1. Rendering Example

This case involves the task of having two different assemblies of a Visual Studio project, one with (part of) the comments stripped out/transformed (for release to the client) and one with all of the comments included in the assembly (for development). There are situations where this is a useful feature, for example when some comments should not be viewed by the client so that when delivering the software to the client, all or part of the comments may need to be stripped out. However, it may be desirable in a development setting to have the comments available to the development team.

When using Visual Studio, the comments to be rendered are included in corresponding similarly named XML files. The XML documentation files are separate from the dynamic-link library files (DLLs) for an assembly and are usually UTF8 XML Files. If they are stored in the same folder as the DLL that they document, and have the same name, then Visual Studio will pick them up. It is also frequent to have another sub-setting where the comments delivered to a client have to follow a format/style that is in accordance to the regulations of the specific client.

3.1.1. Change Cases

Taking into consideration the above requirements, the following change cases are considered:
Case 1

The code changes: Both release and development versions of the assembly have to take this into account.
Case 2

The XML document including the comments changes. In that case, there are the following possibilities:
Case 2.1

Here, the changes are to be visible only to the development team and/or the comments included in the release version are not to be impacted. In that case, no change takes place in the release mode, changes take place in the development mode only.
Case 2.2

Here, the changes are to be visible in the release mode as well. The comments included in the release version are then impacted and changes to both the release and development versions are required.
Case 3

The regulations of the company for comment formatting/styling change. In this case, changes to the release version are required but not to the development version.

3.1.2. Participating Entities

At least four objects need to be represented in this case.

Object 1: The DLL files (here, to simplify, only one DLL file will be considered, denoted DLL).

Object 2: The XML file holding the documentation for the DLL file, denoted XMLOrig. This file includes the original XML document and the associated comments.

Object 3: An XSLT file that holds the transformations that need to be executed to the original XMLOrig so that the resulting XML file that will be included in the final assembly is following the company regulations and/or defines which part of the comments should be stripped out/transformed, denoted XSLT.

Object 4: The resulting XML file after the transformation, denoted XMLTrans.

Object 5: The rendered object, denoted R.

For completeness, two different integrated development environments (IDEs), denoted VS1 and VS2, are also represented that can be used to render the code and comments. For ease of illustration, this example has been simplified, leaving out a number of other objects that would influence the state of the above entities, such as the hardware used.

3.1.3. Dependencies

Two main dependency types are represented in this example. One related to the generation of the rendering object and one to the transformation of the XML file. Furthermore, the rendering can be sub-classified into rendering for the development team, in which case the DLL and XMLOrig objects are important, and the rendering for the client, in which case the DLL and XMLTrans objects are required. The topology of the resulting dependency graphs is shown in FIG. 9.

FIG. 9 shows the topology of the dependency graph at time t with three different intentions shown: render, release and develop. Notice that the paths can be different according to the intention but also can have the same intention and that entities can be shared by different paths (e.g., Render, XMLOrig).

Accordingly the code (illustrated in FIGS. 10-13) is a partial snapshot of the knowledge base holding the different entities at time t (in Turtle http://www.w3.org/TR/turtle/): The comments are noted with # at the beginning of the line, inline for explanations. FIGS. 10-11 illustrate the code for the Transformation Dependency. The code for the Rendering Dependency(ies) is split over FIGS. 12A, 12B, and 13.

3.1.4. Context-Aware Change Propagation for Change Cases

Case 1

The code changes: This means that the DLL changes. Both release and development versions of the assembly have to take this into account. This is a more standard and simpler case that is not detailed further.

Case 2

The XML document including the comments changes. This means that XMLOrig changes:

Case 2.1

Here, the changes should not be propagated in the release mode and/or comments included in the release version are not impacted.

The above change is context-specific where the context is defined by the development intention specific topology of the dependency graph. This means that although XMLOrig changes, changes are not propagated to XMLTrans, as the intention release is not compatible with the intention develop (as noted in the Knowledge Base). Incompatibility here is noted in terms of inconsistency: The intersection of develop and render is the empty set as noted by the axiomatic triple ex:Release owl:disjointWith ex:Develop (and since release is an instance of the Release class while develop of the Develop class). The code shown in FIG. 14 gives a partial snapshot of the KB 98 at different times.

After the change propagation takes place, only the target of the dependency ex:rendDevDep changes, as denoted by ex:rendDevDep lrm:to ex:R'$_1$. Whether the fact lrm:changeMarker lrm:subject ex:XMLOrig is removed or not depends on the change management policy 70 adopted. For instance, if kept, timestamps attached to it could help to infer whether the latest version of the dependency graph is up-to-date.

The dependency path related to the release intention remains unchanged, since the system infers that the intentions are incompatible because ex:Release owl:disjointWith ex:Develop, therefore no change propagation is applied to the target of ex:rendRelDep.

Figure 15:
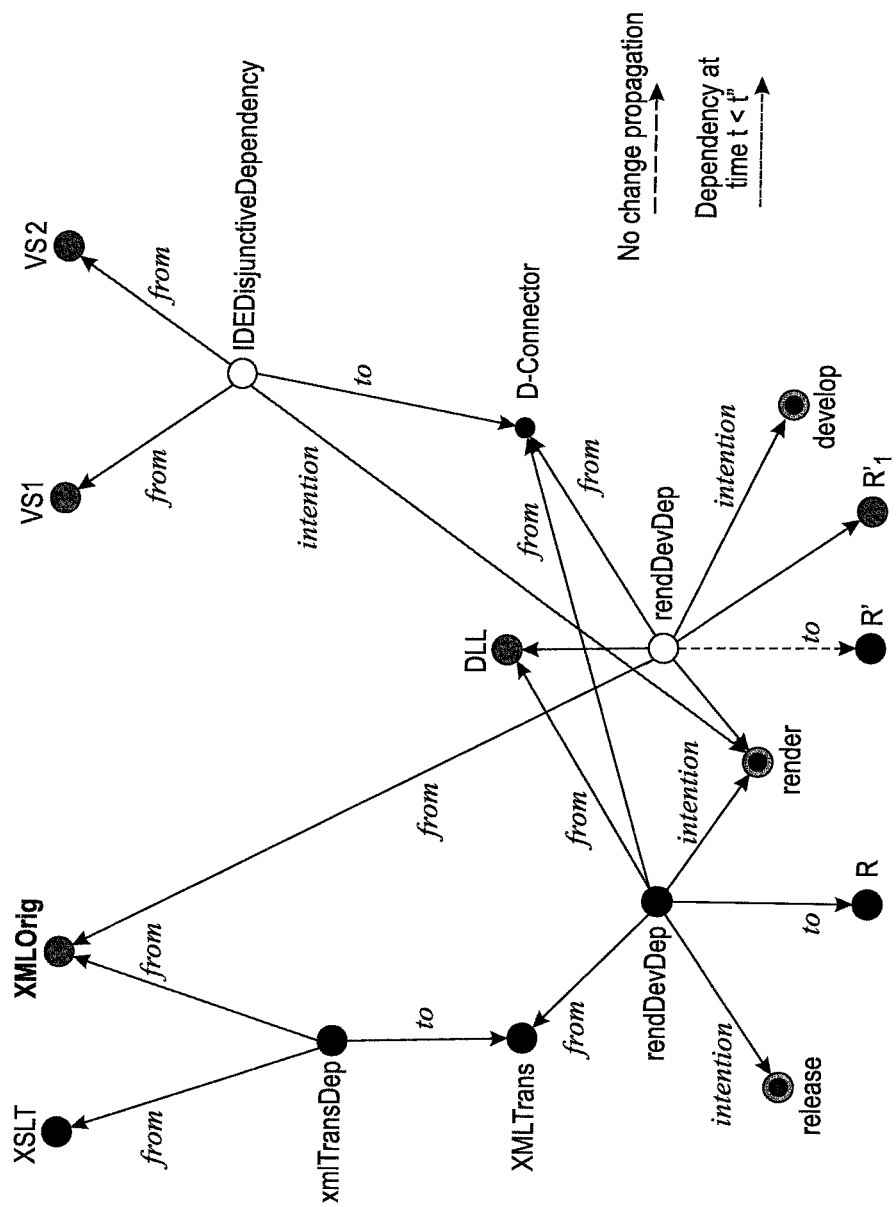
FIG. 15 shows the topology of the dependency graph at time t">t.

The corresponding dependency graph is shown in FIG. 15. This shows the topology of the dependency graph at time t''>t (except for the object R' that is kept to highlight the change that happened). Note that only the part of the graph related to the develop intention is active during change propagation.

Case 2.2

The comments included in the release version are impacted so changes to both the release and development versions are required. This is a standard case that can be solved by previous systems and is not detailed further here.

Case 3

The regulations of the company for comment formatting/styling change. In that case, changes to the release version are required but not to the development version. This means that the XSLT object changes.

The above change is also context-specific as the change should only be propagated in the release mode, however it is an easier case, as the XSLT object is not shared between two different intentions. However, there are different subcases as defined by the preconditions, for example, in the case that the new XSLT object is not well-formed, no change propagation will take place.

3.2. Editing Example

Figure 16:
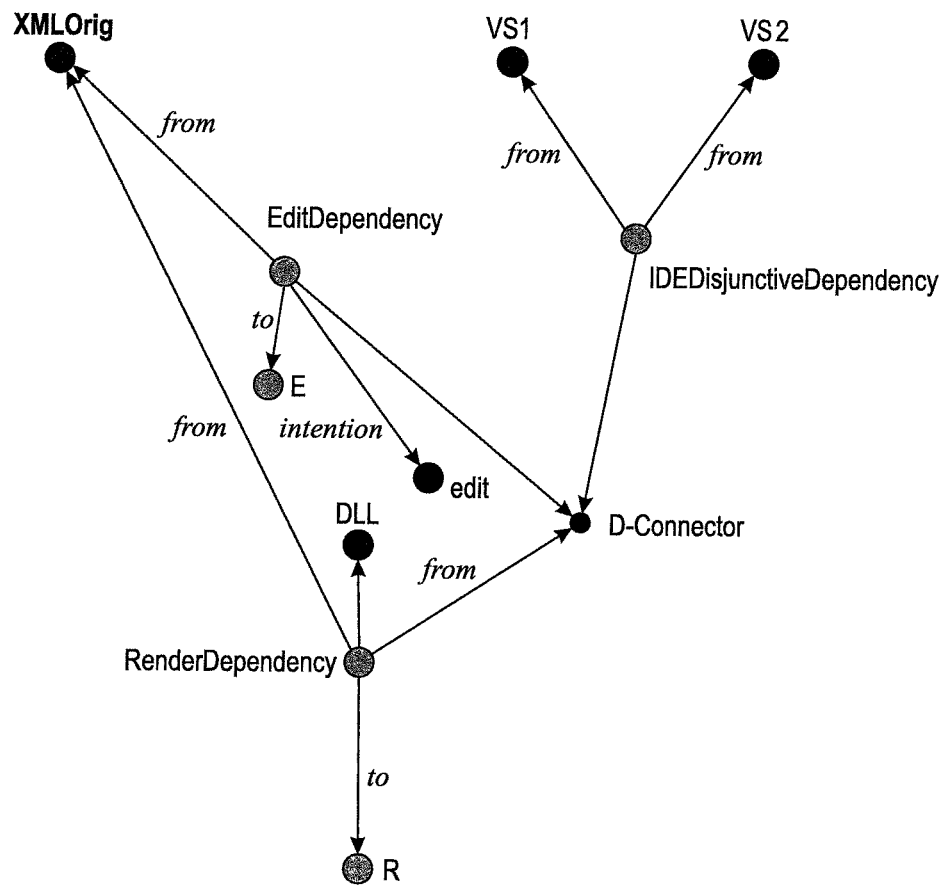
FIG. 16 illustrates a dependency graph suitable for editing XML files.

It may be noted that the same objects that were involved in the rendering example presented above can be shared with other dependency graphs, with the context in terms of intentions being different. For example, the fact that an XML file can also be edited using Visual studio can be expressed with the editing dependency graph shown in FIG. 16.

3.3. Examples in Other Domains

It may be noted that the exemplary method is applicable to different domains. For example, the method will be used for the preservation of software and/or video-based digital art. See, for example, Vion-Dury, J.-Y., et al., "Designing for Inconsistency—The Dependency-based PERICLES Approach," Communications in Computer and Information Science, Vol. 539, pp 458-467 (August 2015); N. Lagos, et al., "On the Preservation of Evolving Digital Content—The Continuum Approach and Relevant Metadata Models," in Metadata and Semantics Research, vol. 544, E. Garoufallou, R. J. Hartley, and P. Gaitanou, Eds. pp. 15-26, 2015, which present a detailed example of a corresponding problem in that domain.

Another example use is in software versioning. See, for example, Jean-Yves Vion-Dury, et al., "Semantic Version Management based on Formal Certification," Proc. 10th Int'l Conf. on Software Paradigm Trends, pp. 19-30, July, 2015. The reference describes a method for software versioning, which encodes backward-compatibility in the version labels. This method could be extended by the integration of the dependency-based propagation method described herein and therefore take into consideration more general context including intent. It is well known that software written to perform the same functionality can be written in different ways. In Pascal Cuoq, "When in doubt, express intent, and leave the rest to the compiler, Trust-in-Soft, Mar. 15, 2015, two different ways of mixing some bits from a pointer p1 with bits from a pointer p2 are described, corresponding to different intents, as shown in Table 1 and Table 2:

TABLE 1

C code that mixing some bits from a pointer p1 with bits from a pointer p2 with the intention of assigning either p1 or p2 to r in constant time

```
void * f2(int c, void * p1, void * p2) {
    void * r = p1;
    uintptr_t mask = -c;
    r = (void*)(((uintptr_t)r & mask) | ((uintptr_t)p2 & ~mask));
    return r;
}
```

TABLE 2

C code that mixing some bits from a pointer p1 with bits from a pointer p2 with the intention of assigning either p1 or p2 to r as fast as possible without any guarantee on constant time computation

```
void * f1(int c, void * p1, void * p2) {
    void * r = p1;
    if (!c) r = p2;
    return r;
}
```

It will be appreciated that variants of the above-disclosed and other features and functions, or alternatives thereof, may be combined into many other different systems or applications. Various presently unforeseen or unanticipated alternatives, modifications, variations or improvements therein may be subsequently made by those skilled in the art which are also intended to be encompassed by the following claims.

What is claimed is:

1. A method for propagating a change in a dependency graph and outputting information based on the propagation, the method comprising:

providing a dependency graph as an instantiation of a linked resource model (lrm) in which a plurality of lrm:resources are linked by a plurality of lrm: dependencies, the lrm: resources including lrm:concrete resources, each of the lrm:concrete resources representing a physical object or a digital object, the lrm:

resources including at least one source lrm: resource and at least one target lrm: resource, each of the lrm:dependencies specifying preconditions on at least one of the at least one source lrm: resource for the lrm:dependency to be activated and an impact on at least one of the at least one target lrm: resources when the lrm:dependency is activated, each of the lrm:dependencies being assigned to a defined class of lrm: dependencies, at least one of the lrm: dependencies being assigned to a class of lrm: dependencies selected from the group consisting of a lrm:conjunctive dependency class and a lrm:disjunctive dependency class, wherein the dependency graph is implemented as a Resource Description Framework (RDF) graph or a triple store, wherein for a lrm:conjunctive dependency which is assigned to the lrm: conjunctive dependency class, if any of the source lrm:resources related to that lrm: dependency is changed then the lrm:dependency is activated, and wherein for a lrm:disjunctive dependency which is assigned to the lrm:disjunctive dependency class, the lrm:dependency is activated only if all source lrm:resources related to that lrm:dependency are changed, wherein in the dependency graph, the lrm:resources and the lrm: dependencies are represented by nodes, wherein the linked resource model permits a first of the lrm: dependencies to be linked to a second of the lrm:dependencies in the dependency graph, without an intervening lrm:resource node, by a dependency connector node that propagates change information; and with a processor, propagating a change to one of the plurality of lrm:resources to at least one other of the plurality of lrm:resources in the graph, using the dependency connector to propagate change information from a first of the lrm:dependencies to a linked second of the lrm:dependencies in the dependency graph; and outputting information based on the propagation, the output information including a request to modify at least one external resource which is represented in the graph, the at least one external resource including a physical object or a digital object; and implementing a change to the at least one of the external resources.

2. The method of claim 1, wherein the plurality of lrm:resources includes lrm:abstract resources, each of the lrm:abstract resources representing an abstract part of an entity or a process.

3. The method of claim 1, wherein the linked resource model permits the first of the lrm:dependencies to be of a different class of lrm:dependencies from the second of the lrm:dependencies.

4. The method of claim 1, wherein in the dependency graph, the nodes are linked by directed edges which indicate properties of relationships between linked nodes.

5. The method of claim 1, wherein the propagating comprises applying at least one of a forward chaining mechanism and a backward chaining mechanism to propagate changes through the dependency graph.

6. The method of claim 5, wherein the forward chaining mechanism comprises, for a source lrm:resource from the plurality of lrm:resources, and for at least one of the lrm: dependencies in the dependency graph which links the source lrm:resource to a target lrm:resource from the plurality of lrm:resources and for which an intention descriptor of the lrm:dependency is compatible with the preconditions for the lrm:dependency to be activated and is compatible with the impact on the target lrm:resource, propagating the change in the source lrm:resource to the target lrm:resource via the lrm:dependency.

7. The method of claim 6, further comprising, for at least one iteration, repeating the forward chaining mechanism using a different lrm:resource from the plurality of lrm: resources as the source lrm:resource.

8. The method of claim 7, wherein the forward chaining mechanism comprises:
checking that the source lrm:resource is not yet in a set of already considered source lrm:resources and if so, then adding the source lrm:resource to the set;
for each lrm:dependency that has a RDF triple in a triple store with a from property with respect to the source lrm:resource, and where the lrm:dependency is compatible with the intention, determining if the precondition and impact of the lrm:dependency satisfy the intention and if so, propagating the change in r to all target lrm:resources that are linked to the source lrm: resource by that lrm:dependency, according to the definition of the impact.

9. The method of claim 5, wherein the backward chaining mechanism comprises, for a target lrm:resource from the plurality of lrm:resources for which a change is not detected, and for at least one of the lrm:dependencies in the dependency graph which links the target lrm:resource to a changed source lrm:resource from the plurality of lrm:resources and for which an intention descriptor of the lrm:dependency is compatible with a chaining intention to be activated and is compatible with an impact on the target lrm:resource, propagating the change in the source lrm:resource to the target lrm:resource via the lrm:dependency, according to the definition of the impact.

10. The method of claim 9, further comprising repeating the backward chaining mechanism for another target lrm: resource from the plurality of lrm:resources.

11. The method of claim 5, wherein the propagating comprises applying both of the forward chaining mechanism and the backward chaining mechanism.

12. The method of claim 1, wherein the output information further comprises:
a modified dependency graph.

13. The method of claim 1, wherein each of the lrm: dependencies specifies an intent which describes the usage of objects involved in the lrm:dependency.

14. A system for propagating a change in a dependency graph and outputting information based on the propagation, the system comprising:
memory which stores a dependency graph as an instantiation of a linked resource model (lrm) in which a plurality of lrm:resources are linked by at least one lrm:dependency, the dependency graph being implemented as a Resource Description Framework (RDF) graph or a triple store, the lrm:resources including lrm:concrete resources, each of the lrm:concrete resources representing a physical object or a digital object, the lrm:resources including at least one source lrm:resource and at least one target lrm:resource, each of the at least one lrm:dependency specifying preconditions on at least one of the at least one source lrm:resource for the lrm:dependency to be activated and an impact on at least one of the at least one target lrm:resources when the lrm:dependency is activated, each of the lrm:dependencies being assigned to a defined class of lrm:dependencies, at least one of the lrm:dependencies being assigned to a class of lrm:

dependencies selected from the group consisting of an lrm:conjunctive dependency class and an lrm:disjunctive dependency class, wherein for an lrm:conjunctive dependency assigned to the lrm:conjunctive dependency class, if any of the source lrm:resources related to that lrm:dependency is changed then the lrm:dependency is activated, and wherein for an lrm:disjunctive dependency assigned to the lrm:disjunctive dependency class, the lrm:dependency is activated only if all source lrm:resources related to that lrm:dependency are changed, wherein in the dependency graph, the lrm:resources and the lrm:dependencies are represented by nodes, wherein the linked resource model permits a first of the lrm:dependencies to be linked to a second of the lrm:dependencies in the dependency graph, without an intervening lrm:resource node, by a dependency connector node that propagates change information;

a propagation component which propagates a change to one of the plurality of lrm:resources to at least one other of the plurality of lrm:resources in the dependency graph, using the dependency connector to propagate change information from a first of the lrm:dependencies to a linked second of the lrm:dependencies in the dependency graph;

an output component which provides for outputting information based on the propagation, the output information including a request to modify at least one external resource which is represented in the graph, the at least one external resource including a physical object or a digital object;

an implementation component which implements a change to one of the external resources; and a processor which implements the propagation component and the output component.

15. A method for propagating a change in a dependency graph and implementing a change to a physical object based on the propagation, the method comprising:

generating a dependency graph as an instantiation of a linked resource model (lrm) in which a plurality of lrm:resources are linked by at least one lrm: dependency, the lrm: resources including lrm:concrete resources, each of the lrm:concrete resources representing a physical object or a digital object, the lrm: resources and the at least one lrm:dependency being represented by nodes, at least some of the lrm:resource nodes being linked to the at least one lrm:dependency node by directed edges which indicate properties of relationships between linked nodes, the lrm: resources including at least one source lrm: resource and at least one target lrm: resource, each of the at least one lrm:dependency specifying preconditions on at least one of the at least one source lrm: resource for the lrm:dependency to be activated and an impact on at least one of the at least one target lrm:resources when the lrm:dependency is activated and an intention of the lrm: dependency, at least one of the lrm:dependencies being assigned to a class of lrm:dependencies selected from the group consisting of an lrm:conjunctive dependency class and an lrm:disjunctive dependency class, wherein for an lrm:conjunctive dependency which is assigned to the lrm: conjunctive dependency class, if any of the source lrm:resources related to that lrm: dependency is changed then the lrm:dependency is activated, and wherein for a lrm:disjunctive dependency which is assigned to the lrm:disjunctive dependency class, the lrm:dependency is activated only if all source lrm:resources related to that lrm:dependency are changed; and with a processor, propagating a change to one of the plurality of lrm:resources to at least one other of the plurality of lrm:resources in the graph the propagating including applying at least one of:

a forward chaining mechanism configured for propagating a change from a source lrm:resource to a target lrm:resource linked to the source lrm:resource by a lrm:dependency to satisfy a given intention, and a backward chaining mechanism configured for propagating a change from a target lrm:resource to a source lrm:resource linked to the target lrm:resource by an lrm:dependency to satisfy a given intention; and implementing a change to a physical object represented by one of the lrm:concrete resources, according to a change policy, the physical object being selected from telephone systems, computers, and printers.

16. The method of claim 15 wherein the processor is configured for propagating a change from a source one of the plurality of lrm:resources to a target one of the lrm:resources with the forward chaining mechanism and configured for propagating a change from a target one of the plurality of lrm:resources to a source one of the lrm:resources with the backward chaining mechanism.

* * * * *